United States Patent
Kase

(10) Patent No.: US 12,437,044 B2
(45) Date of Patent: Oct. 7, 2025

(54) BIOMETRIC DETERMINATION SYSTEM, BIOMETRIC DETERMINATION METHOD, AND COMPUTER PROGRAM

(71) Applicant: NEC Corporation, Tokyo (JP)

(72) Inventor: Takayuki Kase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 18/022,959

(22) PCT Filed: Sep. 30, 2020

(86) PCT No.: PCT/JP2020/037128
§ 371 (c)(1),
(2) Date: Feb. 23, 2023

(87) PCT Pub. No.: WO2022/070301
PCT Pub. Date: Apr. 7, 2022

(65) Prior Publication Data
US 2023/0297655 A1    Sep. 21, 2023

(51) Int. Cl.
*G06F 21/32*    (2013.01)

(52) U.S. Cl.
CPC ................... *G06F 21/32* (2013.01)

(58) Field of Classification Search
CPC ........................................ G06F 21/32
USPC ....................................... 713/186
See application file for complete search history.

(56) References Cited

U.S. PATENT DOCUMENTS

| | | | |
|---|---|---|---|
| 2004/0261989 A1 | 12/2004 | Hara et al. | |
| 2016/0229063 A1* | 8/2016 | Ishiguro | B25J 13/087 |
| 2019/0114495 A1* | 4/2019 | Chang | G01J 5/10 |
| 2019/0162439 A1 | 5/2019 | Tsuda et al. | |
| 2019/0236339 A1 | 8/2019 | Komatsuzaki | |
| 2021/0231502 A1 | 7/2021 | Okamoto et al. | |
| 2022/0327879 A1* | 10/2022 | Hayase | G06V 40/10 |

FOREIGN PATENT DOCUMENTS

| | | | | |
|---|---|---|---|---|
| CN | 105138981 | * | 12/2015 | ............ G06F 21/32 |
| CN | 105138981 A | | 12/2015 | |
| JP | 2004-314887 A | | 11/2004 | |
| JP | 2011-067371 A | | 4/2011 | |
| JP | 2011067371 | * | 4/2011 | |
| JP | 2011-091523 A | | 5/2011 | |
| JP | 2016-184197 A | | 10/2016 | |
| JP | 2019-028516 A | | 2/2019 | |

(Continued)

OTHER PUBLICATIONS

JP Official Communication for JP Application No. 2022-553297, mailed on Jul. 2, 2024 with English Translation.

(Continued)

*Primary Examiner* — Frantz B Jean

(57) ABSTRACT

A biometric determination system includes: a face detection unit that detects a position of a face from an image including the face; a temperature acquisition unit that obtains temperatures at a plurality of points of the face; and a biometric determination unit that determines whether or not the face belongs to a living body on the basis of the temperatures at the plurality of points. According to such a biometric determination system, it is possible to properly detect whether or not the face included in the image belongs to a living body.

9 Claims, 23 Drawing Sheets

(56) References Cited

FOREIGN PATENT DOCUMENTS

| | | |
|---|---|---|
| JP | 2019-083019 A | 5/2019 |
| JP | 2019-126657 A | 8/2019 |
| JP | 2020-062198 A | 4/2020 |
| WO | 2017/209089 A1 | 12/2017 |
| WO | 2020/085303 A1 | 4/2020 |

OTHER PUBLICATIONS

Extended European Search Report for EP Application No. 20956229.7, dated on Oct. 17, 2023.
International Search Report for PCT Application No. PCT/JP2020/037128, mailed on Jan. 12, 2021.

* cited by examiner

| PART | TEMP. | DETERMINATION |
|---|---|---|
| FOREHEAD | 36.8°C | OK |
| RIGHT CHEEK | 36.7°C | OK |
| NOSE | 30.5°C | NG |
| LEFT CHEEK | 22.8°C | NG |
| ⋮ | ⋮ | ⋮ |

FIG. 19

BIOMETRIC DETERMINATION SYSTEM, BIOMETRIC DETERMINATION METHOD, AND COMPUTER PROGRAM

This application is a National Stage Entry of PCT/JP2020/037128 filed on Sep. 30, 2020, the contents of all of which are incorporated herein by reference, in their entirety.

TECHNICAL FIELD

This disclosure relates to a biometric determination system, a biometric determination method, and a computer program that determine a living body or perform biometric determination.

BACKGROUND ART

A known system of this type determines detects a body temperature to perform biometric determination (in other words, spoofing determination). For example, Patent Literature 1 discloses a technique/technology in which information on a heat of a face is determined from an infrared temperature image, and in which a message indicating that biometric authentication is failed is outputted when the heat cannot be detected from the face.

As other related techniques/technologies, for example, Patent Literature 2 discloses a technique/technology of detecting a mask or eyeglasses from a near-infrared image. Patent Literature 3 discloses a technique/technology of detecting that a person is wearing a mask on the basis of a body temperature measurement value obtained by a thermographic function.

CITATION LIST

Patent Literature

Patent Literature 1: JP2019-083019A
Patent Literature 2: JP2019-028516A
Patent Literature 3: JP2016-184197A

SUMMARY

Technical Problem

This disclosure aims to improve the related techniques/technologies described above.

Solution to Problem

A biometric determination system according to an example aspect of this disclosure includes: a face detection unit that detects a position of a face from an image including the face; a temperature acquisition unit that obtains temperatures at a plurality of points of the face; and a biometric determination unit that determines whether or not the face belongs to a living body on the basis of the temperatures at the plurality of points.

A biometric determination method according to an example aspect of this disclosure includes: detecting a position of a face from an image including the face; obtaining temperatures at a plurality of points of the face; and determining whether or not the face belongs to a living body on the basis of the temperatures at the plurality of points.

A computer program according to an example aspect of this disclosure operates a computer: to detect a position of a face from an image including the face; to obtain temperatures at a plurality of points of the face; and to determine whether or not the face belongs to a living body on the basis of the temperatures at the plurality of points.

BRIEF DESCRIPTION OF DRAWINGS

FIG. 19 is a diagram illustrating version 2 of a display example by the biometric determination system according to the seventh example embodiment.

DESCRIPTION OF EXAMPLE EMBODIMENTS

Hereinafter, a biometric determination system, a biometric determination method, and a computer program according to example embodiments will be described with reference to the drawings.

First Example Embodiment

A biometric determination system according to a first example embodiment will be described with reference to FIG. 1 to FIG. 3.
(Hardware Configuration)

First, with reference to FIG. 1, a hardware configuration of the biometric determination system according to the first example embodiment will be described. FIG. 1 is a block diagram illustrating the hardware configuration of the biometric determination system according to the first example embodiment.

Figure 1:
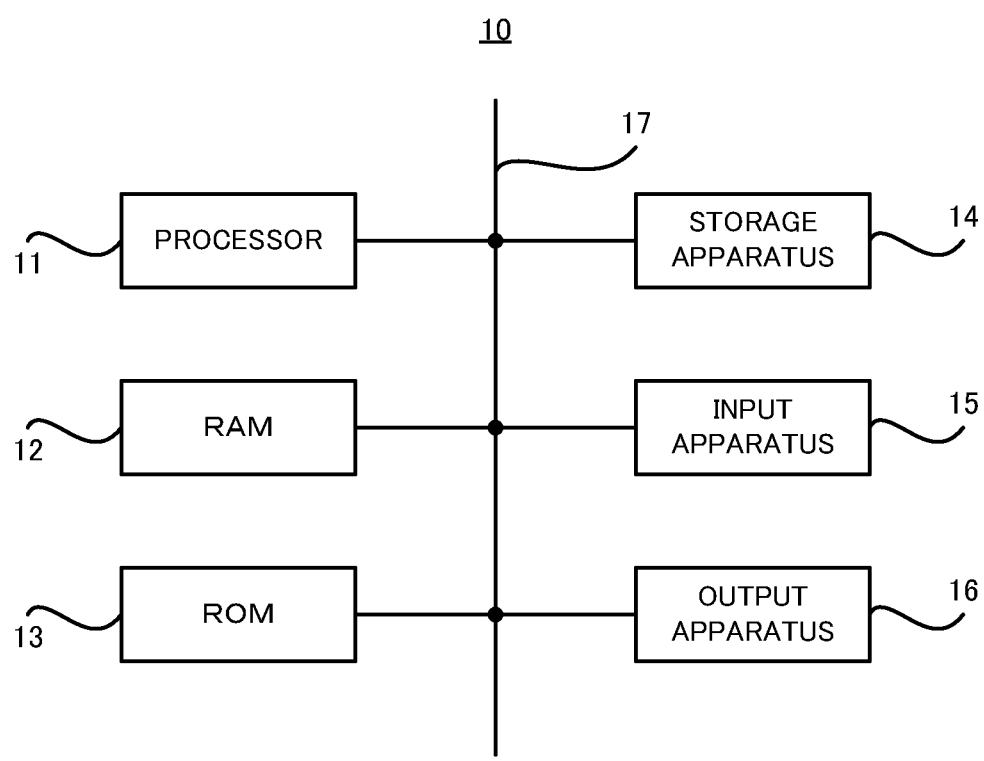
FIG. 1 is a block diagram illustrating a hardware configuration of a biometric determination system according to a first example embodiment.

As illustrated in FIG. 1, a biometric determination system 10 according to the first example embodiment includes a processor 11, a RAM (Random Access Memory) 12, a ROM (Read Only Memory) 13, and a storage apparatus 14. The biometric determination system 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 is configured to read a computer program. For example, the processor 11 reads a computer program stored by at least one of the RAM 12, the ROM 13 and the storage apparatus 14. Alternatively, the processor 11 may read a computer program stored in a computer readable recording medium by using a not-illustrated recording medium reading apparatus. The processor 11 may obtain (i.e., may read) a computer program from a not-illustrated apparatus that is located outside the biometric determination system 10 through a network interface. The processor 11 controls the RAM 12, the storage apparatus 14, the input apparatus 15, and the output apparatus 16 by executing the read computer program. Especially in the example embodiment, when the processor 11 executes the read computer program, a functional block for determining whether or not the face belongs to a living body is realized or implemented in the processor 11. As the processor 11, one of a CPU (Central Processing Unit), a GPU (Graphics Processing Unit), a FPGA (field-programmable gate array), a DSP (Demand-Side Platform), and an ASIC (Application Specific Integrated Circuit may be used, or a plurality of them may be used in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the biometric determination system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the biometric determination system 10. The input apparatus 15 may include, for example, at least one of a keyboard, a mouse, and a touch panel.

The output apparatus 16 is an apparatus that outputs information about the biometric determination system 10 to the outside. For example, the output apparatus 16 may be a display apparatus (e.g., a display) that is configured to display the information about the biometric determination system 10.
(Functional Configuration)

Next, with reference to FIG. 2, a functional configuration of the biometric determination system 10 according to the first example embodiment will be described. FIG. 2 is a block diagram illustrating the functional configuration of the biometric determination system according to the first example embodiment.

Figure 2:
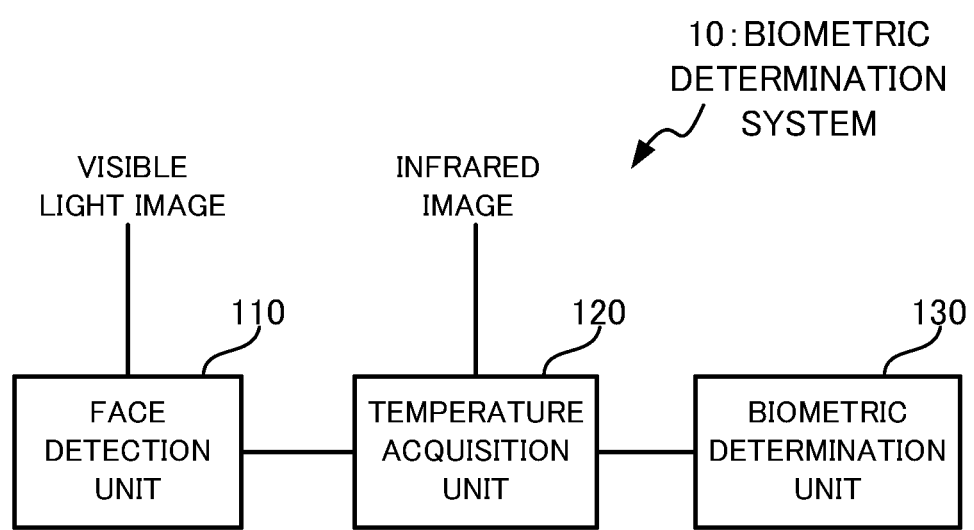
FIG. 2 is a block diagram illustrating a functional configuration of the biometric determination system according to the first example embodiment.

As illustrated in FIG. 2, the biometric determination system 10 according to the first example embodiment includes, as processing blocks or physical processing circuits for realizing its functions, a face detection unit 110, a temperature acquisition unit 120, and a biometric determination unit 130. Each of the face detection unit 110, the temperature acquisition unit 120, and the biometric determination unit 130 may be realized or implemented by the processor 11 (see FIG. 1), for example.

The face detection unit 110 is configured such that a visible light image captured by a visible light camera is inputted, for example. Then, the face detection unit 110 is configured to detect a position of a face from the visible light image that is inputted. The "face" here may be a face of a person, or may be a face of an animal, such as a dog or a snake, other than a person. The face detection unit 110 detects a position of an area occupied by the face in an image, for example. A detailed description of a specific face detection method by the face detection unit 110 will be omitted here because the existing techniques/technologies can be adopted to the method as appropriate. Information about the position of the face detected by the face detection unit 110 is configured to be outputted to the temperature acquisition unit 120.

The temperature acquisition unit 120 is configured such that an infrared image captured by a far-infrared camera is inputted, for example. Then, the temperature acquisition unit 120 is configured to obtain temperatures at a plurality of points of the face from the inputted infrared image. The temperature acquisition unit 120 may obtain the temperatures at the plurality of points of the face on the basis of the position of the face detected by the face detection unit 110. A specific example of the points for which the temperature acquisition unit 120 obtains the temperatures will be described in detail in other example embodiments described below. Information on the temperatures at the plurality of points obtained by the temperature acquisition unit 120 is configured to be outputted to the biometric determination unit 130.

In order that the temperature acquisition unit 120 is allowed to detect the temperature of the face on the basis of the position of the face detected by the face detection unit 110, the visible light image that is inputted to the face detection unit 110 and the infrared image that is inputted to the temperature acquisition unit 120 may be images in which a positional relationship between them is known (specifically, images between which coordinate transformation is possible). For example, the visible light image and the infrared image may be captured at the same angle of view. Alternatively, the visible light image and the infrared light image may be images in which a correlation between them is adjusted by using the camera's pan-tilt-zoom function or image transformation.

The biometric determination unit 130 is configured to determine whether or not the face belongs to a living body, on the basis of the temperatures at the plurality of points of the face obtained by the temperature acquisition unit 120. In other words, the biometric determination unit 130 determines whether a captured face is a face of a living body, or a face of a non-living body (e.g., a "spoofed" face using an image, a photograph, a 3D mask, or the like). Content of a specific determination process by the biometric determination unit 130 will be described in detail in other example embodiments described later.

(Flow of Operation)

Next, with reference to FIG. 3, a flow of operation of the biometric determination system according to the first example embodiment will be described. FIG. 3 is a flowchart illustrating the flow of the operation of the biometric determination system according to the first example embodiment.

Figure 3:
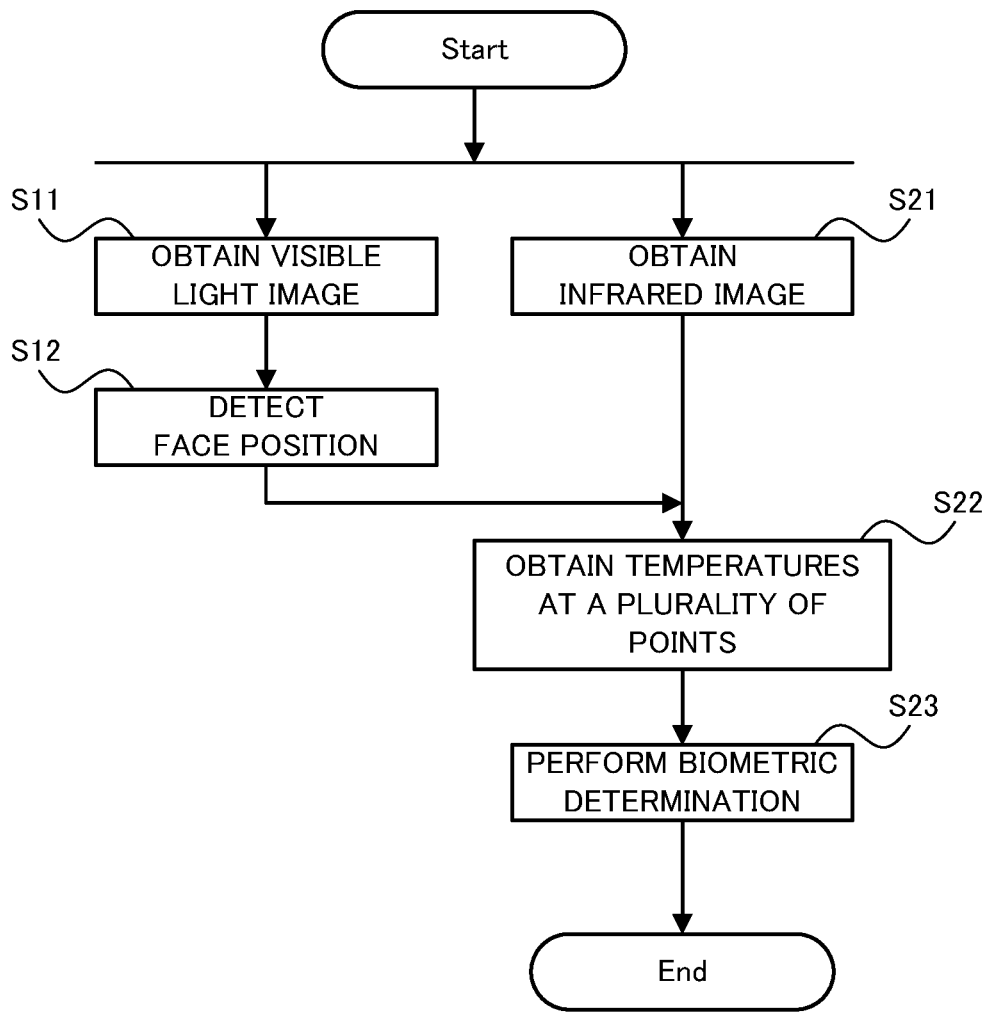
FIG. 3 is a flowchart illustrating a flow of operation of the biometric determination system according to the first example embodiment.

As illustrated in FIG. 3, at the start of the operation of the biometric determination system according to the first example embodiment, first, the face detection unit 110 obtains the visible light image (step S11). Then, the face detection unit 110 detects the position of the face from the obtained visible light image (step S12). The face detection unit 110 outputs the information about the detected position of the face, to the temperature acquisition unit 120.

On the other hand, the temperature acquisition unit 120 obtains the infrared image (step S21). Then, the temperature acquisition unit 120 obtains the temperatures at the plurality of points of the face from the obtained infrared image (step S22). The temperature acquisition unit 120 may obtain the temperatures at the plurality of points of the face by using the position of the face detected by the face detection unit 110.

Subsequently, the biometric determination unit 130 determines whether or not the face belongs to a living body on the basis of the temperatures at the plurality of points obtained by the temperature acquisition unit 120 (step S23). The biometric determination unit 130 may output a determination result to the outside of the system.

(Technical Effect)

Next, a technical effect obtained by the biometric determination system 10 according to the first example embodiment will be described.

As described in FIG. 1 to FIG. 3, in the biometric determination system 10 according to the first example embodiment, it is determined whether or not the face belongs to a living body on the basis of the temperatures at the plurality of points. By using the temperatures at the plurality of points as described above, it is possible to determine whether or not the face belongs to a living body more properly, compared to the biometric determination based on the temperature at one point of the face. In other words, since the biometric determination takes into account the temperatures at more points (in other words, the determination is performed by using more informations), it is possible to increase accuracy/precision of the biometric determination. For example, even if one point of a face that does not belong to a living body provides a temperature that allows the estimation of a living body, if another point provides the temperature that does not allow the estimation of a living body, then, it is possible to accurately determine that the face does not belong to a living body.

Second Example Embodiment

The biometric determination system 10 according to a second example embodiment will be described with reference to FIG. 4 and FIG. 5. The second example embodiment is partially different from the first example embodiment described above only in the configuration and operation, and may be the same as the first example embodiment in other parts. For this reason, the parts that differ from the first example embodiment described above will be described in detail below, and a description of the other overlapping parts will be omitted as appropriate.

(Functional Configuration)

First, with reference to FIG. 4, a functional configuration of the biometric determination system 10 according to the second example embodiment will be described. FIG. 4 is a block diagram illustrating the functional configuration of the biometric determination system according to the second example embodiment. In FIG. 4, the same components as those illustrated in FIG. 2 carry the same reference numerals.

Figure 4:
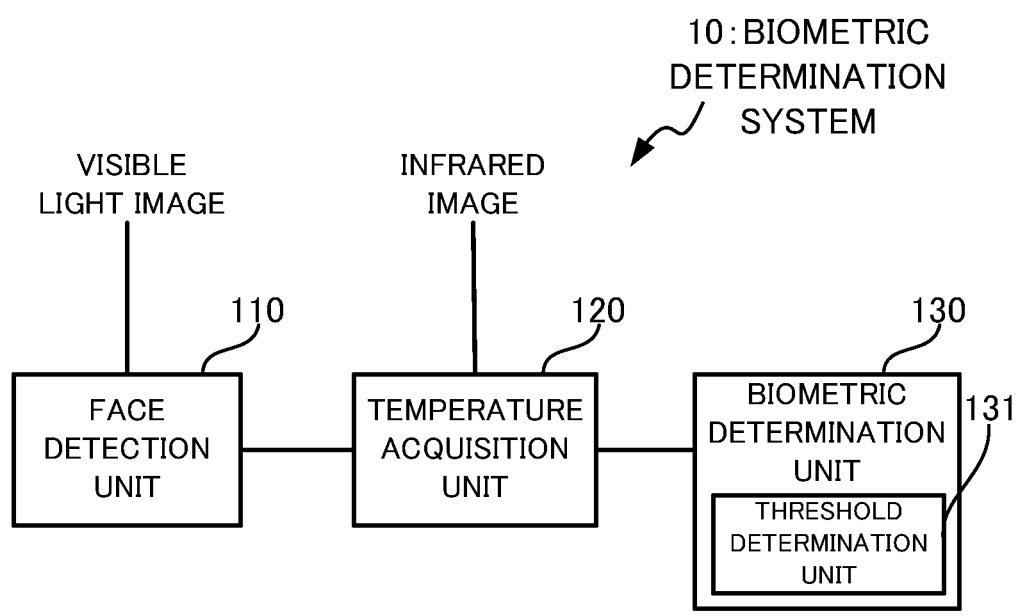
FIG. 4 is a block diagram illustrating a functional configuration of a biometric determination system according to a second example embodiment.

As illustrated in FIG. 4, the biometric determination system 10 according to the second example embodiment includes, as processing blocks or physical processing circuits for realizing its functions, the face detection unit 110, the temperature acquisition unit 120, and the biometric determination unit 130. In particular, the biometric determination unit 130 according to the second example embodiment includes a threshold determination unit 131.

The threshold determination unit 131 determines whether or not each of the temperatures at the plurality of points obtained by the temperature acquisition unit 120 exceeds a predetermined threshold. Here, the "predetermined threshold" is a threshold for determining whether or not each of the temperatures at the plurality of points is a temperature corresponding to a body temperature, and is set in advance as a value of about 36 degrees C. to 37 degrees C., for example. Furthermore, the predetermined threshold may be adjusted as appropriate, on the basis of an imaging environment for an image (e.g., ambient temperature and moisture, etc.). The predetermined threshold may be adjusted as appropriate, on the basis of the temperatures of a target person that are obtained in a past predetermined time (e.g., in a past one hour). In this case, an average value of the temperatures obtained in the predetermined time may be used to adjust the predetermined threshold. Specifically, when the ambient temperature is high or when humidity is high, a predetermined threshold may be increased. Conversely, when the ambient temperature is low or when the humidity is low, the predetermined threshold may be reduced.

The threshold determination unit 131 is further configured to count the number of temperatures that exceed the predetermined threshold, out of the temperatures at the plurality of points. More specifically, the threshold determination unit 131 is configured to determine whether or not the number of temperatures that exceed the predetermined threshold is greater than or equal to a predetermined number. Here, the "predetermined number" is a threshold for determining a situation in which the temperature exceeds the predetermined threshold at many points enough to determine that the face belongs to a living body, and is set to a value corresponding to the points for which the temperatures are detected (e.g., a majority of the detection points, etc.). Furthermore, the threshold determination unit 131 may be configured to calculate a predetermined score in accordance with whether the temperatures at the plurality of points exceed the predetermined threshold, and to determine whether or not the predetermined score exceeds a score threshold. The "predetermined score" here is a score calculated as a higher value with increasing number of temperatures at the plurality of points that exceed the predetermined threshold. For the calculation of the predetermined score, weighting may be performed at each of a plurality of parts: for example, 2 points for a forehead, 1 point for a nose, and 0.5 points for cheeks. The points that are at symmetric sites of the face, such as a right cheek and a left cheek, may provide similar temperatures in the case of a living body. On the other hand, when the face does not belong to a living body (i.e., spoofing, etc.), it is considered that there is a difference in temperature between the right cheek and the left cheek. Considering such a situation, for example, the score may be calculated high (e.g., 3 points) when the temperature difference is small between the both cheeks, and the score may be calculated low when the temperature difference is large (e.g., −3 points).

(Flow of Operation)

Next, with reference to FIG. 5, a flow of operation of the biometric determination system 10 according to the second example embodiment will be described. FIG. 5 is a flowchart illustrating the flow of the operation of the biometric determination system according to the second example embodiment. In FIG. 5, the same steps as those illustrated in FIG. 3 carry the same reference numerals.

Figure 5:
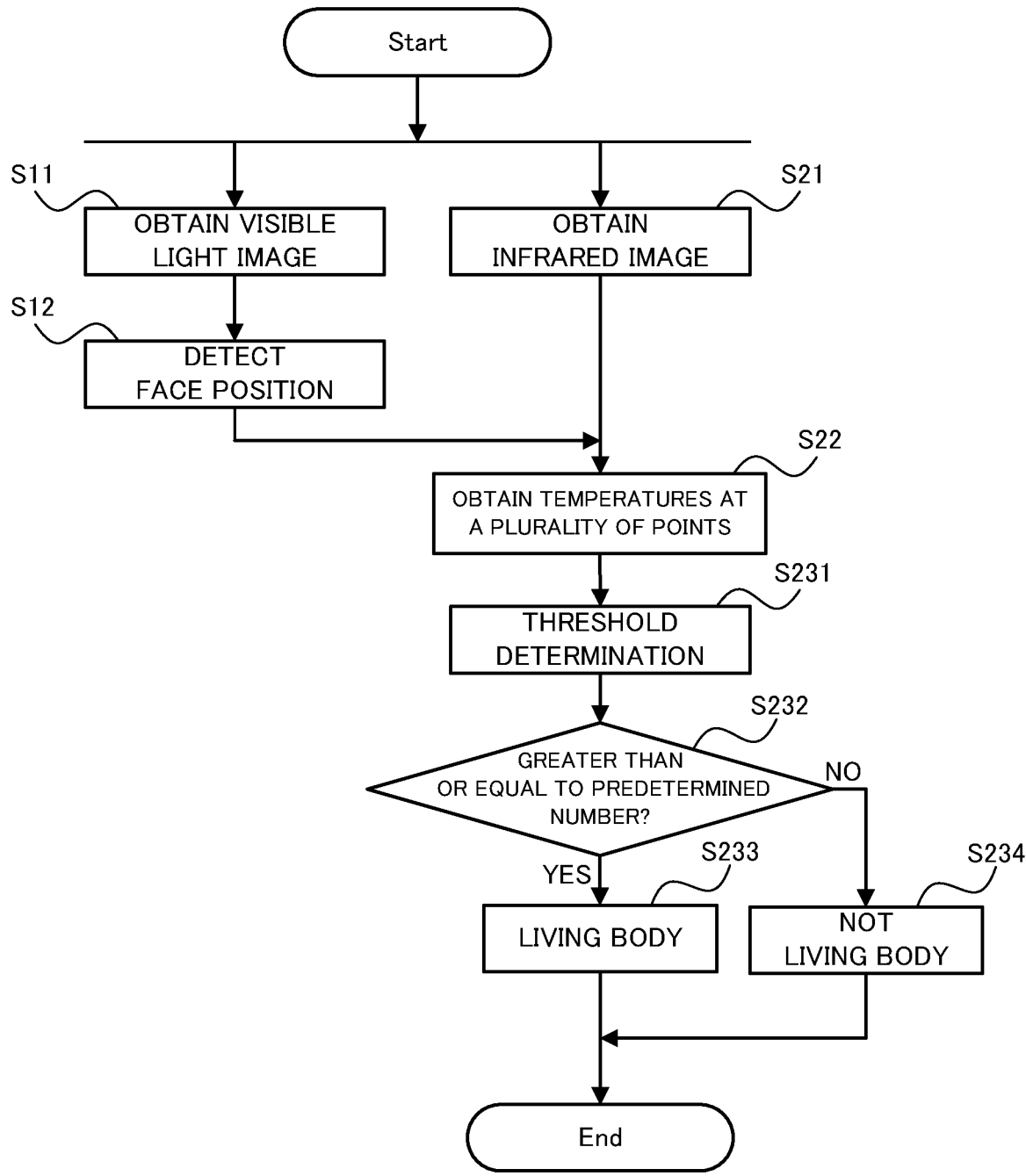
FIG. 5 is a flowchart illustrating a flow of operation of the biometric determination system according to the second example embodiment.

As illustrated in FIG. 5, at the start of the operation of the biometric determination system according to the second example embodiment, first, the face detection unit 110 obtains the visible light image (the step S11). Then, the face detection unit 110 detects the position of the face from the obtained visible light image (the step S12). The face detection unit 110 outputs the information about the detected position of the face, to the temperature acquisition unit 120.

On the other hand, the temperature acquisition unit 120 obtains the infrared image (the step S21). Then, the temperature acquisition unit 120 obtains the temperatures at the plurality of points of the face from the obtained infrared image and the position of the face detected by the face detection unit 110 (the step S22).

Subsequently, the threshold determination unit 131 determines whether or not each of the plurality of temperatures exceeds the predetermined threshold (step S231). Then, the threshold determination unit 131 determines whether or not the number of temperatures that exceed the predetermined threshold is greater than or equal to the predetermined number (step S232). When the number of temperatures that exceed the predetermined threshold is greater than or equal to the predetermined number (the step S232: YES), the biometric determination unit 130 determines that the face belongs to a living body (step S233). On the other hand, when the number of temperatures that exceed the predetermined threshold is less than the predetermined number (the step S232: NO), the biometric determination unit 130 determines that the face does not belong to a living body (step S234). When the threshold determination unit 131 calculates the predetermined score described above, the threshold determination unit 131 may determine whether or not the predetermined score exceeds the score threshold. In this case, when the predetermined score exceeds the score threshold, the biometric determination unit 130 may determine that the face belongs to a living body. In addition, the biometric determination unit 130 may determine that the face does not belong to a living body when the predetermined score does not exceed the score threshold.

(Technical Effect)

Next, a technical effect obtained by the biometric determination system 10 according to the second example embodiment will be described.

As described in FIG. 4 and FIG. 5, in the biometric determination system 10 according to the second example embodiment, biometric determination is performed by comparing the temperatures at the plurality of points with the predetermined threshold. In this way, it is possible to easily and accurately determine whether or not the face belongs to a living body, on the basis of the temperatures at the plurality of points.

Third Example Embodiment

The biometric determination system 10 according to a third example embodiment is described with reference to FIG. 6 to FIG. 8. The third example embodiment is partially different from the first and second example embodiments described above only in the configuration and operation, and may be the same as the first and second example embodiments in other parts. For this reason, the parts that differ from each of the example embodiments described above will be described in detail below, and a description of the other overlapping parts will be omitted as appropriate.

(Functional Configuration)

First, with reference to FIG. 6, a functional configuration of the biometric determination system 10 according to the third example embodiment will be described. FIG. 6 is a block diagram illustrating the functional configuration of the biometric determination system according to the third example embodiment. In FIG. 6, the same components as those illustrated in FIG. 2 carry the same reference numerals.

Figure 6:
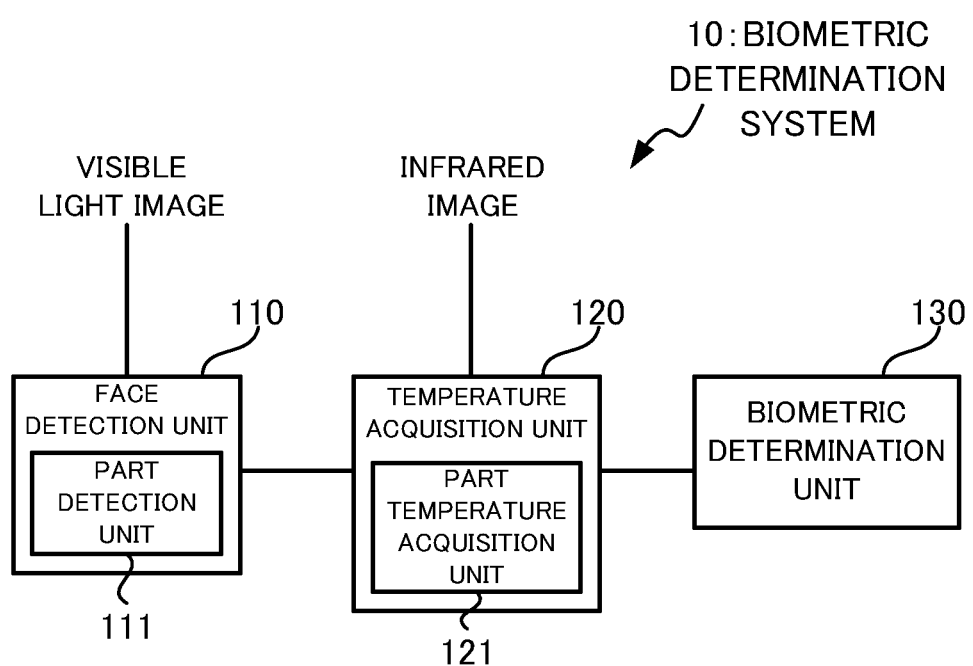
FIG. 6 is a block diagram illustrating a functional configuration of a biometric determination system according to a third example embodiment.

As illustrated in FIG. 6, the biometric determination system 10 according to the third example embodiment includes, as processing blocks or physical processing circuits for realizing its functions, the face detection unit 110, the temperature acquisition unit 120, and the biometric determination unit 130. In particular, the face detection unit 110 according to the third example embodiment includes a part detection unit 111. Furthermore, the temperature acquisition unit 120 according to the third example embodiment includes a part temperature acquisition unit 121.

The part detection unit 111 is configured to detect a position of each part (e.g., a forehead, cheeks, a nose, etc.) of the face, on the basis of the position of the face detected by the face detection unit 110. The part detection unit 111 may extract a feature quantity indicating a feature of the face from a face area in an image and may detect each part of the face on the basis of the feature quantity, for example. Information about the position of each part detected by the part detection unit 111 is configured to be outputted to the part temperature acquisition unit 121.

The part temperature acquisition unit 121 is configured to obtain a temperature of each part detected by the part detection unit 111. The part temperature acquisition unit 121 may obtain a temperature at a certain point in an area occupied by each part, as the temperature of the part, or may obtain temperatures at a plurality of points in the area occupied by each part, as the temperature of the part. The temperature of each part obtained by the part temperature acquisition unit 121 is configured to be outputted to the biometric determination unit 130

(Flow of Operation)

Next, with reference to FIG. 7, a flow of operation of the biometric determination system according to the third example embodiment will be described. FIG. 7 is a flowchart illustrating the flow of the operation of the biometric determination system according to the third example embodiment. In FIG. 7, the same steps as those illustrated in FIG. 3 carry the same reference numerals.

Figure 7:
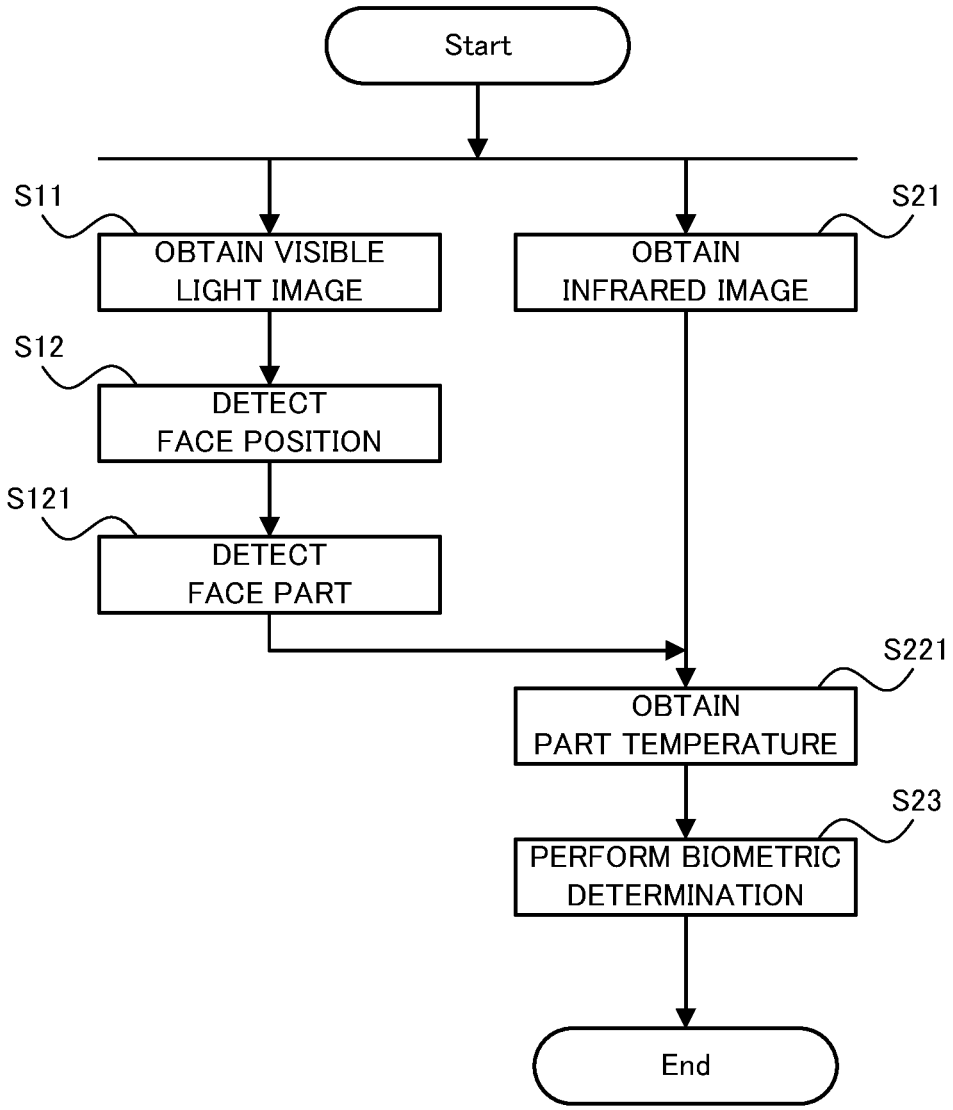
FIG. 7 is a flowchart illustrating a flow of operation of the biometric determination system according to the third example embodiment.

As illustrated in FIG. 7, at the start of the operation of the biometric determination system according to the third example embodiment, first, the face detection unit 110 obtains the visible light image (the step S11). Then, the face detection unit 110 detects the position of the face from the obtained visible light image (the step S12).

Subsequently, the part detection unit 111 detects the position of the part of the face (step S121). The part detection unit 111 outputs the information about the detected position of the part of the face, to the temperature acquisition unit 120 (more specifically, to the part temperature acquisition unit 121).

On the other hand, the temperature acquisition unit 120 obtains the infrared image (the step S21). Then, the part temperature acquisition unit 121 obtains the temperature of the part of the face, from the obtained infrared image and the position of the part of the face detected by the part detection unit 111 (step S221).

Subsequently, the biometric determination unit 130 determines whether or not the face belongs to a living body on the basis of the temperature of the part of the face obtained by the part temperature acquisition unit 121 (the step S23)

(Detection Example of Part Temperature)

Figure 8:
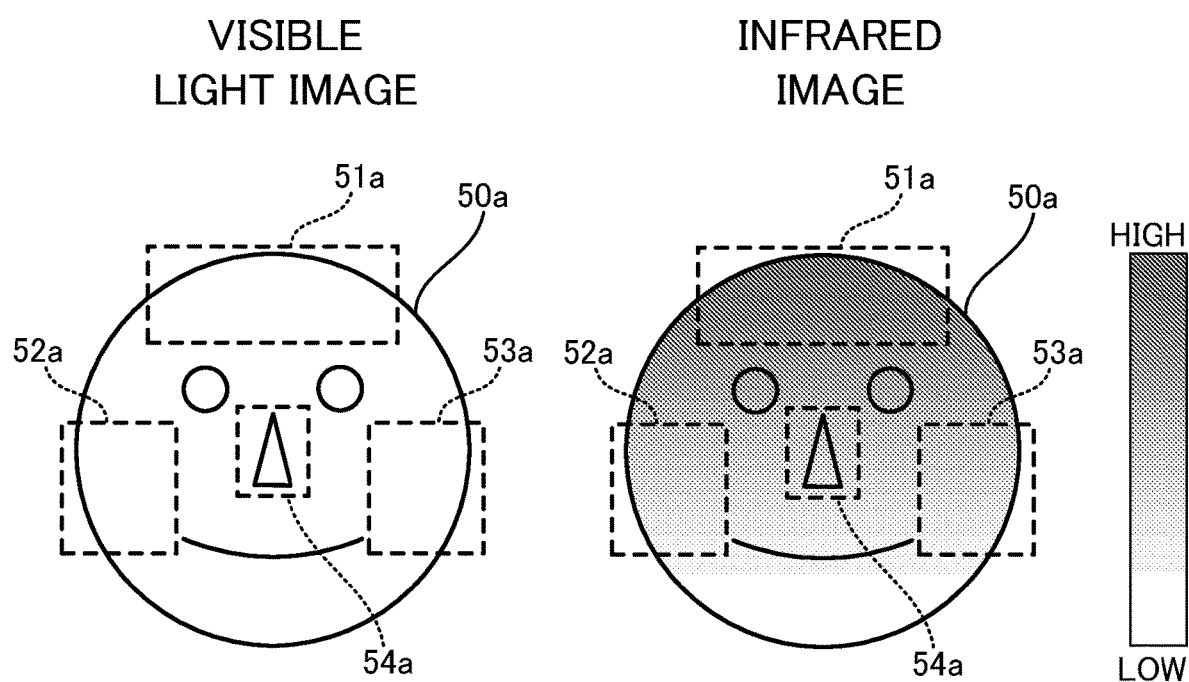
FIG. 8 is a conceptual diagram illustrating a detection example of a part temperature obtained by the biometric determination system according to the third example embodiment.

Next, with reference to FIG. 8, a detection example of a part temperature detected by biometric determination system 10 according to the third example embodiment will be specifically described. FIG. 8 is a conceptual diagram illustrating the detection example of the part temperature obtained by the biometric determination system according to the third example embodiment.

As illustrated in FIG. 8, the part detection unit 111 detects a forehead 51a, a right cheek 52a, a left cheek 53a, and a nose 54a, respectively, from a face 50a detected from the visible light image. Then, the part temperature acquisition unit 121 identifies, from a face 50b in the infrared image, a forehead 51b, a right cheek 52b, a left cheek 53b, and a nose 54b respectively corresponding to the forehead 51a, the right cheek 52a, the left cheek 53a, and the nose 54a described above, and obtains the temperatures thereof. The forehead 51a, the right cheek 52a, the left cheek 53a, and the nose 54a described above are merely examples, and the temperature may be obtained from another part of the face (e.g., a lacrimal punctum). In addition, the temperature may be obtained at a plurality of points in one part of the face. For example, in the nose part 54b, the temperature may be obtained separately at a root of the nose, below the nose, at a tip of the nose, or the like. In this case, an average value of the temperatures obtained at the plurality of points of the nose 54b may be obtained as the temperature of the nose part 54b Suppose that the biometric determination unit 130 includes the threshold determination unit 131 as in the second example embodiment. In each area of the forehead 51b, the right cheek part 52b, the left cheek part 53b, and the nose part 54b, when an areal ratio of points in which the temperature exceeds the predetermined threshold is greater than or equal to a predetermined ratio, the threshold determination unit 131 may determine that the temperature of the part exceeds the predetermined threshold. In this case, the predetermined threshold may be different for each part.

(Technical Effect)

Next, a technical effect obtained by the biometric determination system 10 according to the third example embodiment will be described.

As described with FIG. 6 to FIG. 8, in the biometric determination system 10 according to the third example embodiment, each part of the face is detected, and the temperature is obtained for each part. In this way, it is possible to properly obtain the temperatures at the plurality of points of the face. Furthermore, it is also possible to determine whether or not the face belongs to a living body, more specifically, by using a tendency of the body temperature in each part (e.g., the forehead has a higher temperature than that of the cheek, the right cheek and the left cheek have substantially the same temperature, etc.).

Fourth Example Embodiment

The biometric determination system 10 according to a fourth example embodiment will be described with reference to FIG. 9 to FIG. 12. The fourth example embodiment is partially different from the first to third example embodiments described above only in the configuration and operation, and may be the same as the first to third example embodiments in other parts. For this reason, the parts that differ from each of the example embodiments described above will be described in detail below, and a description of the other overlapping parts will be omitted as appropriate.

(Functional Configuration)

Figure 9:
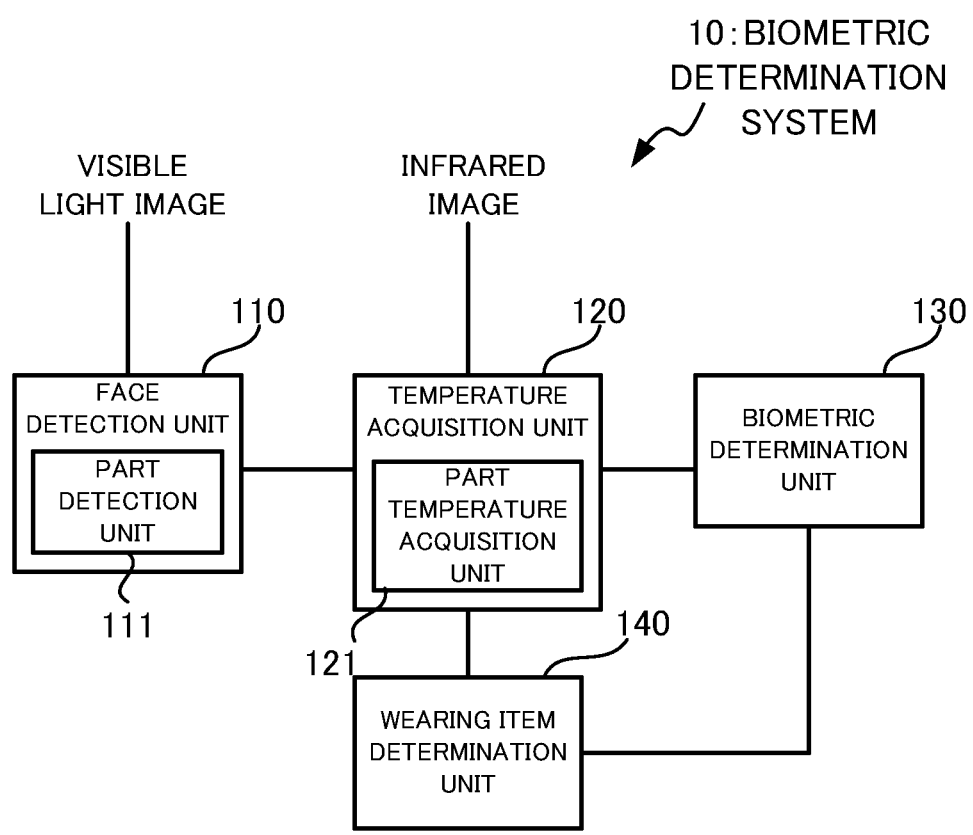
FIG. 9 is a block diagram illustrating a functional configuration of a biometric determination system according to a fourth example embodiment.

First, with reference to FIG. 9, a functional configuration of the biometric determination system 10 according to the fourth example embodiment will be described. FIG. 9 is a block diagram illustrating the functional configuration of the biometric determination system according to the fourth example embodiment. In FIG. 9, the same components as those illustrated in FIG. 6 carry the same reference numerals.

As illustrated in FIG. 9, the biometric determination system 10 according to the fourth example embodiment includes, as processing blocks or physical processing circuits for realizing its functions, the face detection unit 110, the temperature acquisition unit 120, the biometric determination unit 130, and a wearing item determination unit 140. In other words, the biometric determination system 10 according to the fourth example embodiment further includes a wearing item determination unit 140 in addition to the configuration of the biometric determination system according to the third example embodiment (see FIG. 6). The wearing item determination unit 140 may be realized or implemented by the processor 11 (see FIG. 1), for example.

The wearing item determination unit 140 is configured to determine whether or not there is a wearing item (e.g., a hat, eyeglasses, a mask, or the like) on the basis of the temperatures at the plurality of points detected in the temperature acquisition unit 120. A specific determination operation in the wearing item determination unit 140 will be described in detail later. The wearing item determination unit 140 may be configured to output information about the presence or absence of a wearing item to the biometric determination unit 130. In this case, the biometric determination unit 130 may determine whether or not the face belongs to a living body in view of the presence or absence of a wearing item.
(Flow of Operation)

Figure 10:
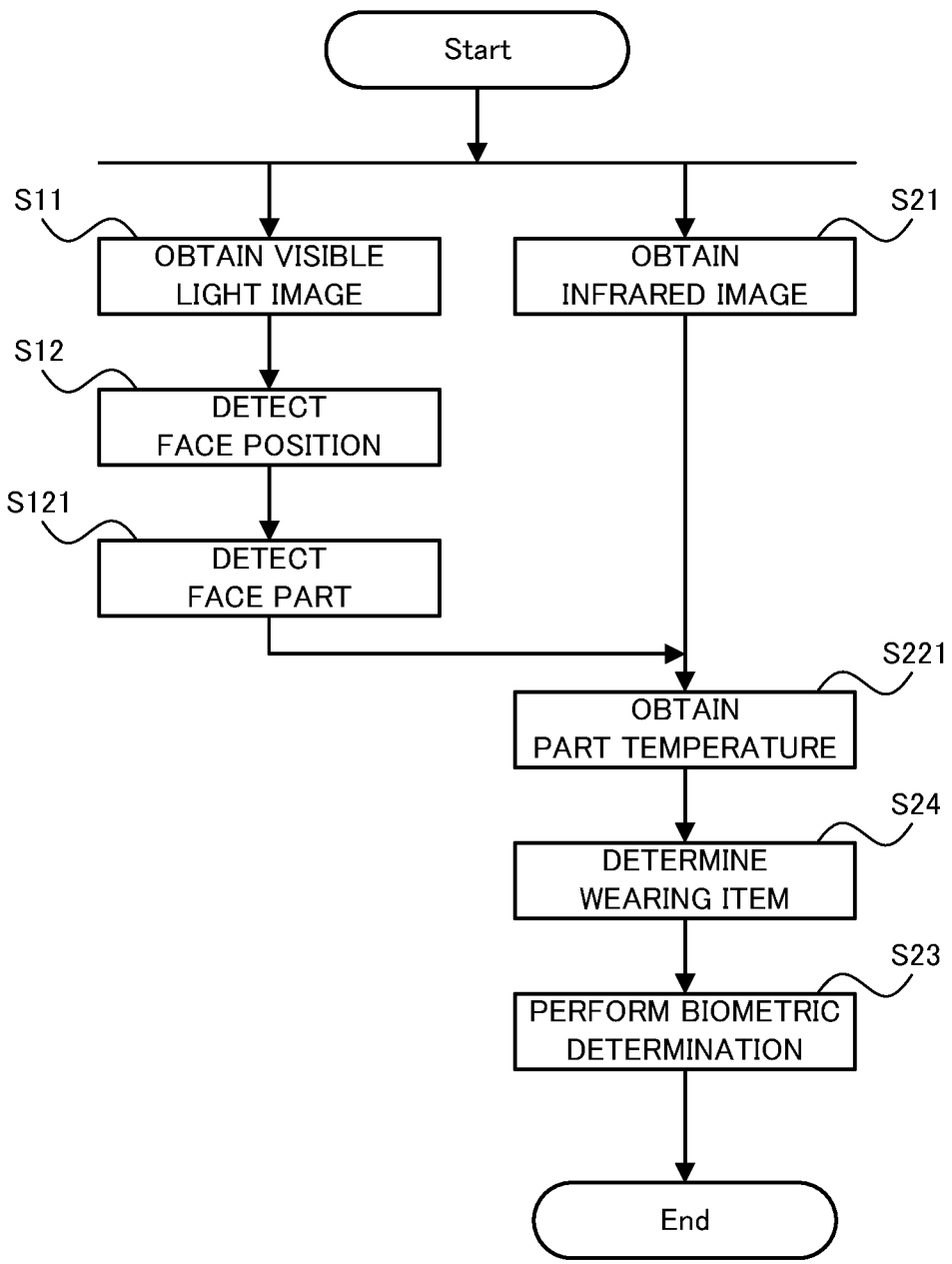
FIG. 10 is a flowchart illustrating a flow of operation of the biometric determination system according to the fourth example embodiment.

Next, with reference to FIG. 10, a flow of operation of the biometric determination system according to the fourth example embodiment will be described. FIG. 10 is a flowchart illustrating the flow of the operation of the biometric determination system according to the fourth example embodiment. In FIG. 10, the same steps as those illustrated in FIG. 7 carry the same reference numerals.

As illustrated in FIG. 10, at the start of the operation of the biometric determination system 10 according to the fourth example embodiment, first, the face detection unit 110 obtains the visible light image (the step S11). Then, the face detection unit 110 detects the position of the face from the obtained visible light image (the step S12).

Subsequently, the part detection unit 111 detects the position of the part of the face (the step S121). The part detection unit 111 outputs the information about the detected position of the part of the face, to the temperature acquisition unit 120

On the other hand, the temperature acquisition unit 120 obtains the infrared image (the step S21). Then, the part temperature acquisition unit 121 obtains the temperature of the part of the face, from the obtained infrared image and the position of the part of the face detected by the part detection unit 111 (the step S221).

Subsequently, the wearing item determination unit 140 determines whether or not there is a wearing item from the temperature of the part of the face (step S24). The step S24 (i.e., a wearing item determination process) may be performed in accordance with a result of the step S221 (i.e., a process of obtaining the temperature of the part of the face). For example, the wearing item determination unit 140 may perform the step S24 when there is a temperature that does not exceed the threshold among the temperatures at the plurality of points of the face. The wearing item determination unit 140 determines that the wearing item is less likely putted on when all of the temperatures at the plurality of points exceed the threshold, and the step S24 may be omitted. The biometric determination unit 130 determines whether or not the face belongs to a living body on the basis of the temperature of part of the face obtained by the part temperature acquisition unit 121 (the step S23).
(Wearing Item Determination Operation)

Figure 11:
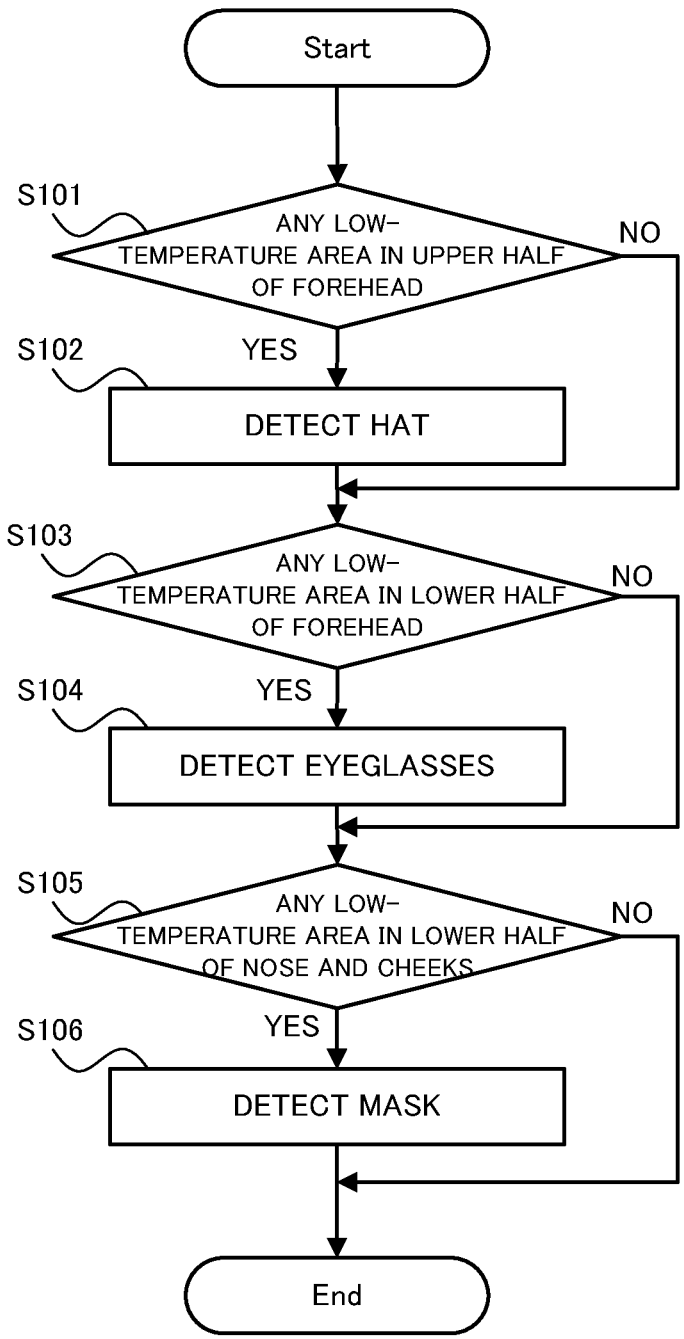
FIG. 11 is a flowchart illustrating a flow of a wearing item determination operation of the biometric determination system according to the fourth example embodiment.

Next, with reference to FIG. 11, a wearing item determination operation (i.e., the step S24 in FIG. 10) by the biometric determination system 10 according to the fourth example embodiment will be described in detail. FIG. 11 is a flowchart illustrating the flow of the wearing item determination operation of the biometric determination system according to the fourth example embodiment.

As illustrated in FIG. 11, at the start of the wearing item determination processing, the wearing item determination unit 140 determines whether or not there is a low-temperature area (i.e., a area with a lower temperature than the body temperature) in an upper half of the forehead (step S101). Then, when there is a low-temperature area in the upper half of the forehead (the step S101: YES), the wearing item determination unit 140 detects a hat (step S102). When there is no low-temperature area in the upper half of the forehead (the step S101: NO), the wearing item determination unit 140 does not detect a hat (i.e., the step S102 is omitted).

Subsequently, the wearing item determination unit 140 determines whether or not there is a low-temperature area in a lower half of the forehead (step S103). When there is a low-temperature area in the lower half of the forehead (the step S103: YES), the wearing item determination unit 140 detects eyeglasses (step S104). When there is no low-temperature area in the lower half of the forehead (the step S103: NO), the wearing item determination unit 140 does not detect eyeglasses (i.e., the step S104 is omitted).

Subsequently, the wearing item determination unit 140 determines whether or not there is a low-temperature area in a lower half of the nose and the cheeks (step S105). When there is a low-temperature area in the lower half of the nose and the cheeks (the step S105: YES), the wearing item determination unit 140 detects a mask (step S106). When there is no low-temperature area in the lower half of the nose and the cheeks (the step S105: NO), the wearing item determination unit 140 does not detect a mask (i.e., the step S106 is omitted).

The above-described example describes the operation of detecting a hat, eyeglasses, and a mask. When another wearing item is detected, it may be determined whether or not a area corresponding to the wearing item is the low-temperature area, in the same manner as the above-described operation.
(Example of Operations after Wearing Item Determination)

Figure 12:
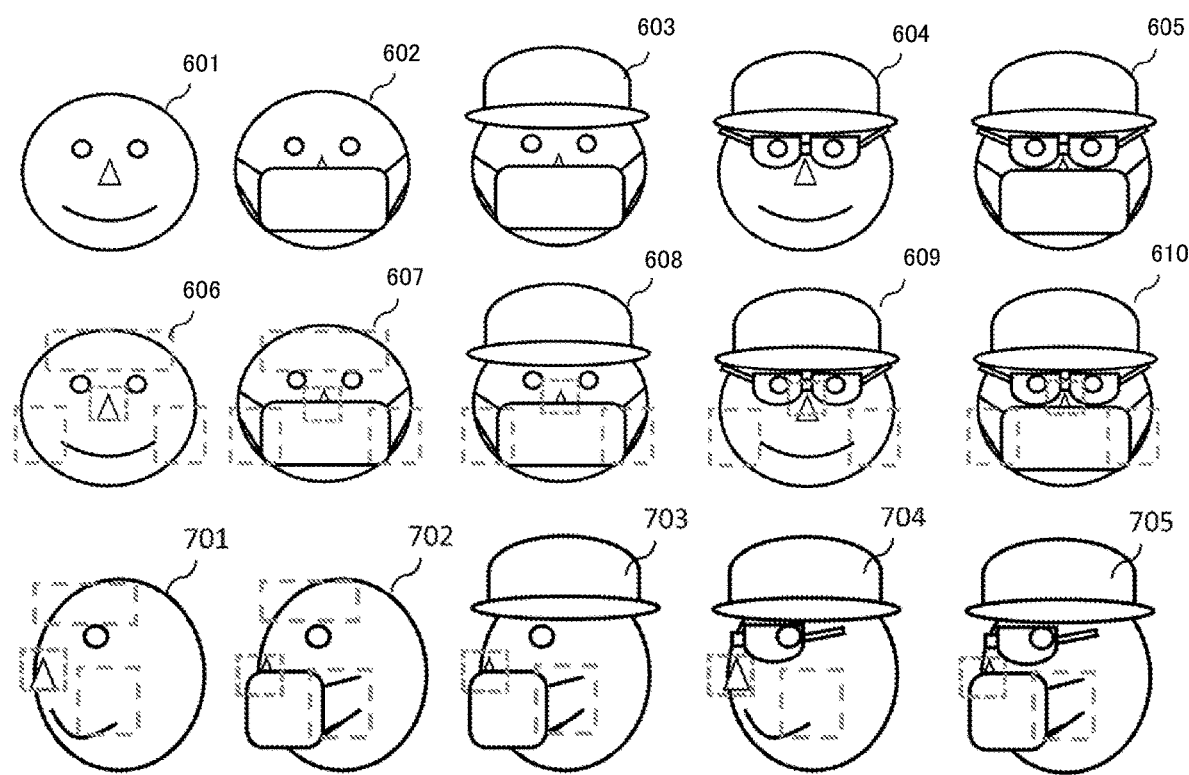
FIG. 12 is a conceptual diagram illustrating an example of a change in a temperature acquisition area depending on the presence or absence of a wearing item.

Next, an example of operations after the wearing item determination process is performed will be specifically described with reference to FIG. 12. FIG. 12 is a conceptual diagram illustrating an example of a change in a temperature acquisition area depending on the presence or absence of a wearing item.

As illustrated in FIG. 12, the part of the face in which the temperature is obtained may be changed in accordance with a determination result of the wearing item determination unit 140. That is, the temperature acquisition unit 120 may reobtain the temperature of the part of the face on the basis of the determination result of the wearing item determination unit 140. For example, from a face 601 without a wearing item, the temperatures of a forehead, both cheeks, a nose, and a lacrimal punctum may be obtained (see 606). From a face 602 with a mask, the temperatures of the forehead, the both cheeks, the nose, and the lacrimal punctum may be obtained (see 607). When a mask is detected, temperature acquisition positions of the both cheeks and the nose may be shifted so as to avoid the mask. From a face 603 with a hat and a mask, the temperatures of the both cheeks and the nose may be obtained (see 608). From a face 604 with a cap and eyeglasses, the temperatures of the both cheeks and the nose may be obtained (see 609). From a face 605 with a hat, eyeglasses, and a mask, the temperatures of the both cheeks and the nose may be obtained (see 610). This also applies when a face included in an image is a lateral face (see 701 to 705).

In addition, a notification (e.g., a notification by a display or audio) may be provided to a target person in accordance with the determination result of the wearing item determination unit 140. For example, when the target person is wearing a hat or sunglasses, the target person may be notified to take off the hat or sunglasses. When the target person is wearing a mask, the target person may be notified to face a camera while wearing the mask. When the target person is not wearing a mask, the target person may be notified to wear a mask.
(Technical Effect)

Next, a technical effect obtained by the biometric determination system 10 according to the fourth example embodiment will be described.

As described with reference to FIG. 9 to FIG. 12, the biometric determination system 10 according to the fourth example embodiment is configured to determine whether or not there is a wearing item from the temperatures at the plurality of points of the face. In addition, it is possible to determine whether or not the face belongs to a living body in view of the presence of a wearing item, for example, by changing the temperature acquisition position depending on the position of a wearing item.

Fifth Example Embodiment

The biometric determination system 10 according to a fifth example embodiment will be described with reference to FIG. 13 and FIG. 14. The fifth example embodiment is partially different from the first to fourth example embodiments described above only in the configuration and operation, and may be the same as the first to fourth example embodiments in other parts. For this reason, the parts that differ from each of the example embodiments described above will be described in detail below, and a description of the other overlapping parts will be omitted as appropriate.
(Functional Configuration)

First, with reference to FIG. 13, a functional configuration of the biometric determination system 10 according to the fifth example embodiment will be described. FIG. 13 is a block diagram illustrating the functional configuration of the biometric determination system according to the fifth example embodiment. In FIG. 13, the same components as those illustrated in FIG. 9 carry the same reference numerals.

Figure 13:
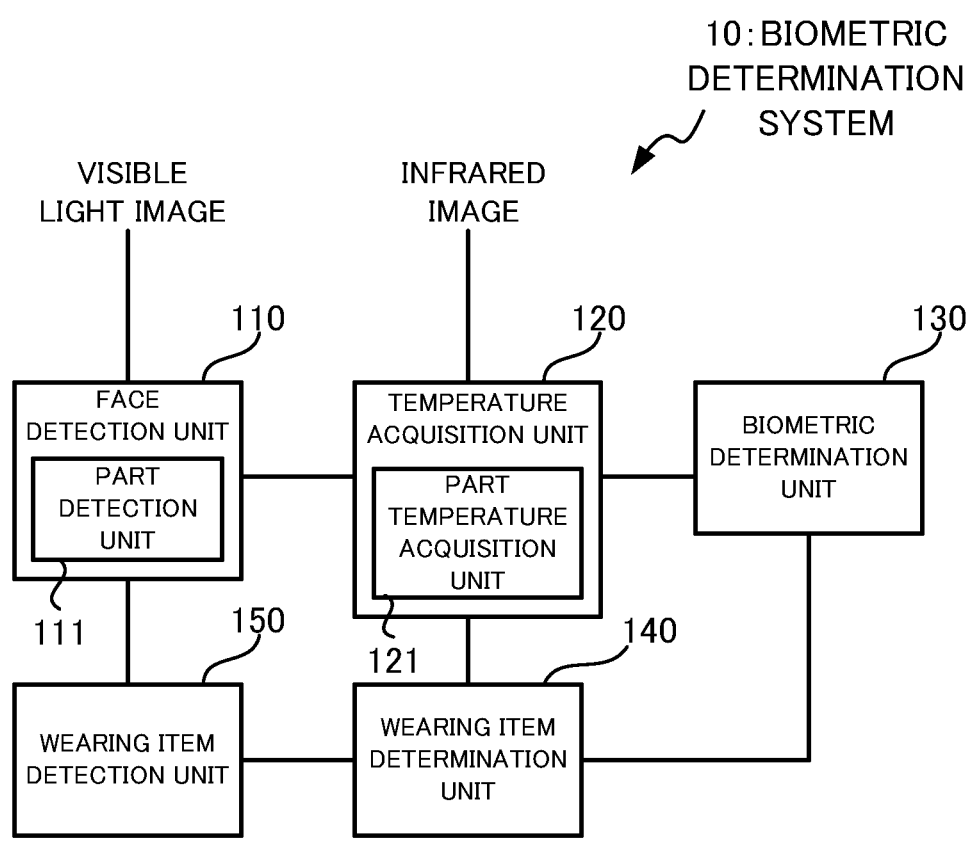
FIG. 13 is a block diagram illustrating a functional configuration of a biometric determination system according to a fifth example embodiment.

As illustrated in FIG. 13, the biometric determination system 10 according to the fifth example embodiment includes, as processing blocks or physical processing circuits for realizing its functions, the face detection unit 110, the temperature acquisition unit 120, the biometric determination unit 130, the wearing item determination unit 140, and a wearing item detection unit 150. In other words, the biometric determination system 10 according to the fifth example embodiment further includes a wearing item detection unit 150 in addition to the configuration of the biometric determination system according to the fourth example embodiment (see FIG. 9). The wearing item detection unit 150 may be realized or implemented by the processor 11 (see FIG. 1), for example.

The wearing item detection unit 150 is configured to detect a wearing item (i.e., a wearing item that can be determined by the wearing item determination unit 140 described in the fourth example embodiment) from the visible light image. A detailed explanation of a technique/technology for detecting a wearing item from the image will be omitted here because the conventional techniques/technologies can be adopted as appropriate. Information about the wearing item detected by the wearing item detection unit 150 is configured to be outputted to the wearing item determination unit 140.
(Flow of Operation)

Next, with reference to FIG. 14, a flow of operation of the biometric determination system according to the fifth example embodiment will be described. FIG. 14 is a flowchart illustrating the flow of the operation of the biometric determination system according to the fifth example embodiment. In FIG. 14, the same steps as those illustrated in FIG. 10 carry the same reference numerals.

Figure 14:
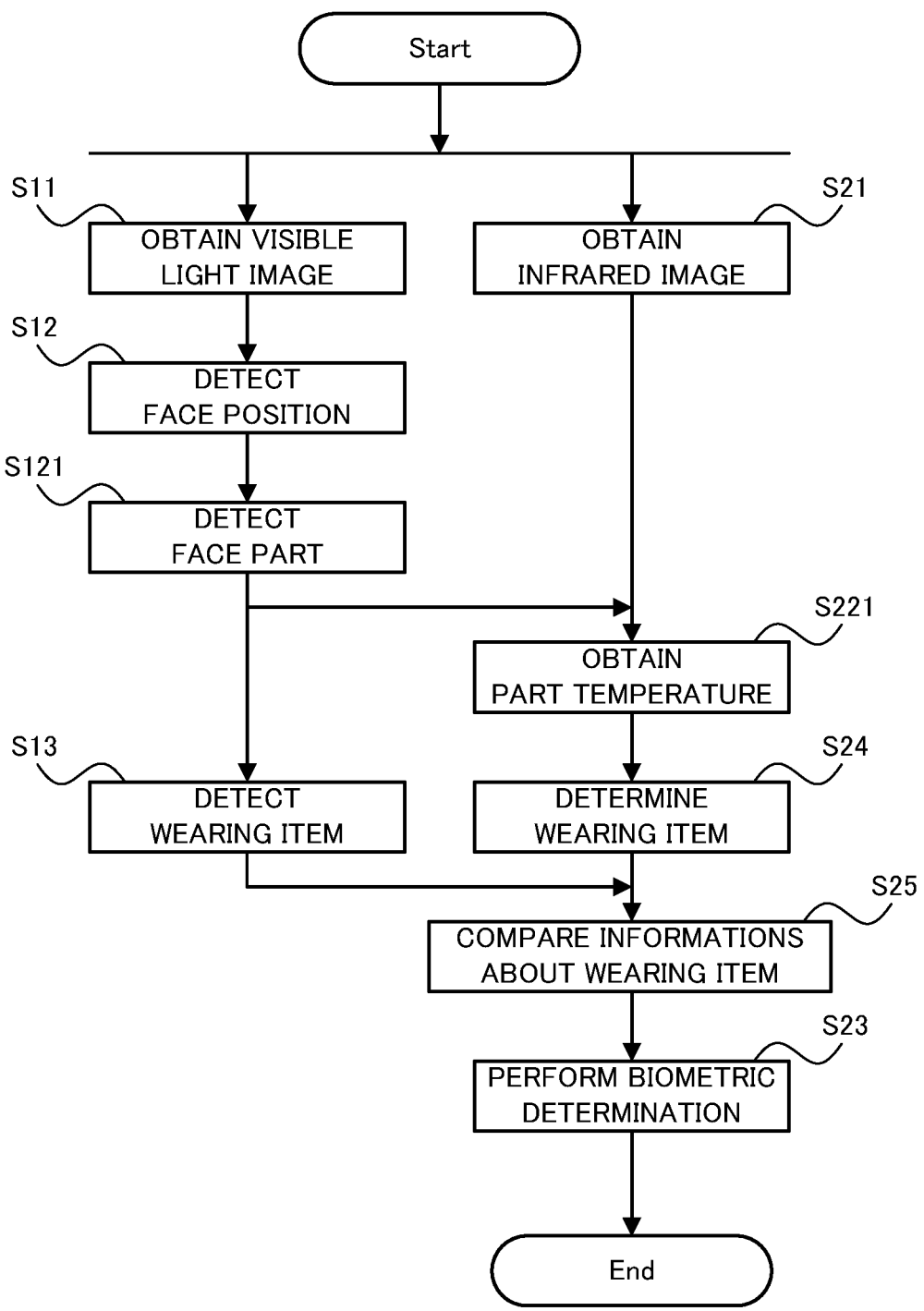
FIG. 14 is a flowchart illustrating a flow of operation of the biometric determination device according to the fifth example embodiment.

As illustrated in FIG. 14, at the start of the operation of the biometric determination system 10 according to the fifth example embodiment, first, the face detection unit 110 obtains the visible light image (the step S11). Then, the face detection unit 110 detects the position of the face from the obtained visible light image (the step S12).

Subsequently, the part detection unit 111 detects the position of the part of the face (the step S121). The part detection unit 111 outputs the information about the detected position of the part of the face to the temperature acquisition unit 120. Furthermore, the wearing item detection unit 150 detects the wearing item from the visible light image (step S13). The wearing item detection unit 150 outputs the information about the detected wearing item to the wearing item determination unit 140.

On the other hand, the temperature acquisition unit 120 obtains the infrared image (the step S21). Then, the part temperature acquisition unit 121 obtains the temperature of the part of the face, from the obtained infrared image and the position of the part of the face detected by the part detection unit 111 (the step S221).

Subsequently, the wearing item determination unit 140 determines whether or not there is a wearing item from the temperature of the part of the face (the step S24). The wearing item determination unit 140 compares the information about the presence or absence of the wearing item obtained as the determination result, with the information about the wearing item obtained as a detection result of the wearing item detection unit 150 (step S25). More specifically, the wearing item determination unit 140 compares the determination result of the wearing item with the detection result of the wearing item, and determines whether or not they agree with each other.

Subsequently, the biometric determination unit 130 determines whether or not the face belongs to a living body on the basis of the temperature of the part of the face obtained by the part temperature acquisition unit 121 (the step S23). The biometric determination unit 130 may determine whether or not the face belongs to a living body in view of the determination result regarding the presence or absence of the wearing item by the wearing item determination unit 140 and a comparison result of the informations about the wearing item.
(Technical Effect)

Next, a technical effect obtained by the biometric determination system 10 according to the fifth example embodiment will be described.

As described with reference to FIG. 13 and FIG. 14, in the biometric determination system according to the fifth example embodiment, the determination result of the wearing item by the wearing item determination unit 140 (i.e., the determination result of the wearing item based on the temperature) and the detection result of the wearing item by the wearing item detection unit 150 (i.e., the detection result of the wearing item based on the image) are compared with each other.

The comparison result of the informations about the wearing item described above may be used to obtain a more accurate determination result of the wearing item. For example, even when the wearing item determination unit 140 determines that there is a wearing item, if the wearing item detection unit 150 does not detect the wearing item, then, the wearing item determination unit 140 may change the determination result to that there is no wearing item (or may determine again whether or not there is a wearing item). Similarly, even when the wearing item determination unit 140 determines that there is no wearing item, if the wearing item detecting unit 150 detects the wearing item, then, the wearing item determination unit 140 may change the determination result to that there is a wearing item (or may determine again whether or not there is a wearing item). In this way, it is possible to improve the accuracy/precision of the determination by the wearing item determination unit 140.

The comparison result of the informations about the wearing item may be used for the determination of the biometric determination unit 130. For example, even when the wearing item determination unit 140 determines that there is a wearing item, if the wearing item detection unit 150 does not detect the wearing item, then, the biometric determination unit 130 may determine that there is a low-temperature area that allows misrecognition that there is no wearing item despite of the presence of the wearing item, and may determine that the face does not belong to a living body (i.e., some "spoofing" is performed). Furthermore, even when the wearing item determination unit 140 determines that there is no wearing item, if the wearing item detection unit 150 detects the wearing item, then, the biometric determination unit 130 may determine that a high temperature is obtained despite of the presence of the wearing item, and may determine that the face does not belong to a living body (i.e., some "spoofing" is performed). In this way, it is possible to improve the accuracy/precision of the determination result in the biometric determination unit 130.

Sixth Example Embodiment

The biometric determination system 10 according to a sixth example embodiment will be described with reference to FIG. 15 and FIG. 16. The sixth example embodiment is partially different from the first to fifth example embodiments described above only in the configuration and operation, and may be the same as the first to fifth example embodiments in other parts. For this reason, the parts that differ from each of the example embodiments described above will be described in detail below, and a description of the other overlapping parts will be omitted as appropriate.
(Functional Configuration)

First, with reference to FIG. 15, a functional configuration of the biometric determination system 10 according to the sixth example embodiment will be described. FIG. 15 is a block diagram illustrating the functional configuration of the biometric determination system according to the sixth example embodiment. In FIG. 15, the same components as those illustrated in FIG. 6 carry the same reference numerals.

Figure 15:
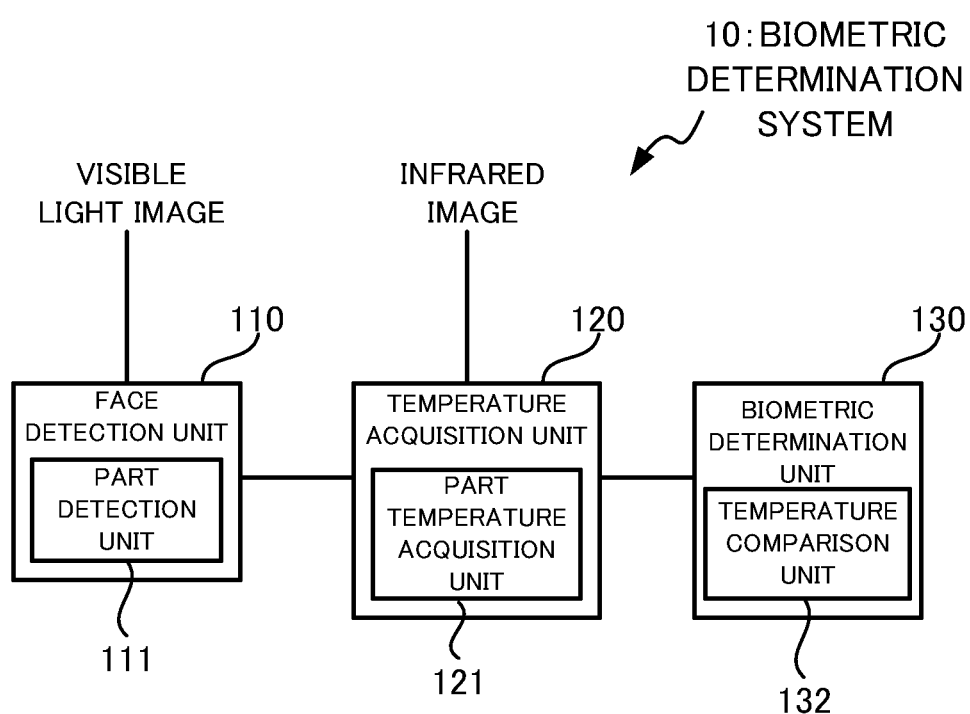
FIG. 15 is a block diagram illustrating a functional configuration of a biometric determination system according to a sixth example embodiment.

As illustrated in FIG. 15, the biometric determination system 10 according to the sixth example embodiment includes, as processing blocks or physical processing circuits for realizing its functions, the face detection unit 110, the temperature acquisition unit 120, and the biometric determination unit 130. In particular, the biometric determination unit 130 according to the sixth example embodiment includes a temperature comparison unit 132

The temperature comparison unit 132 is configured to compare the temperatures at the plurality of points of the face obtained by the temperature acquisition unit 120 with each other. The temperature comparison unit 132 may be configured to not only determine whether the temperatures at the plurality of points are high or low, but also determine whether or not a relationship between the temperatures at the plurality of points satisfies a predetermined rule. The "predetermined rule" here corresponds to a tendency of temperature depending on the part (position) of the face. For example, the rule may include whether the temperature of the forehead is higher than the temperature of the nose, whether a temperature difference between the temperature of the right cheek and the temperature of the left cheek is within a predetermined range, or whether the temperature of each part is in appropriate descending order (e.g., the order that takes into account the temperature tendency of each part), or the like. The predetermined rule may be a combination of the plurality of rules including the above examples. A comparison result by the temperature comparison unit 132 may be considered in the determination of whether or not the face belongs to a living body on the biometric determination unit 130.
(Flow of Operation)

Next, with reference to FIG. 16, a flow of operation of the biometric determination system according to the sixth example embodiment will be described. FIG. 16 is a flowchart illustrating the flow of the operation of the biometric determination system according to the sixth example embodiment. In FIG. 16, the same steps as those illustrated in FIG. 7 carry the same reference numerals.

Figure 16:
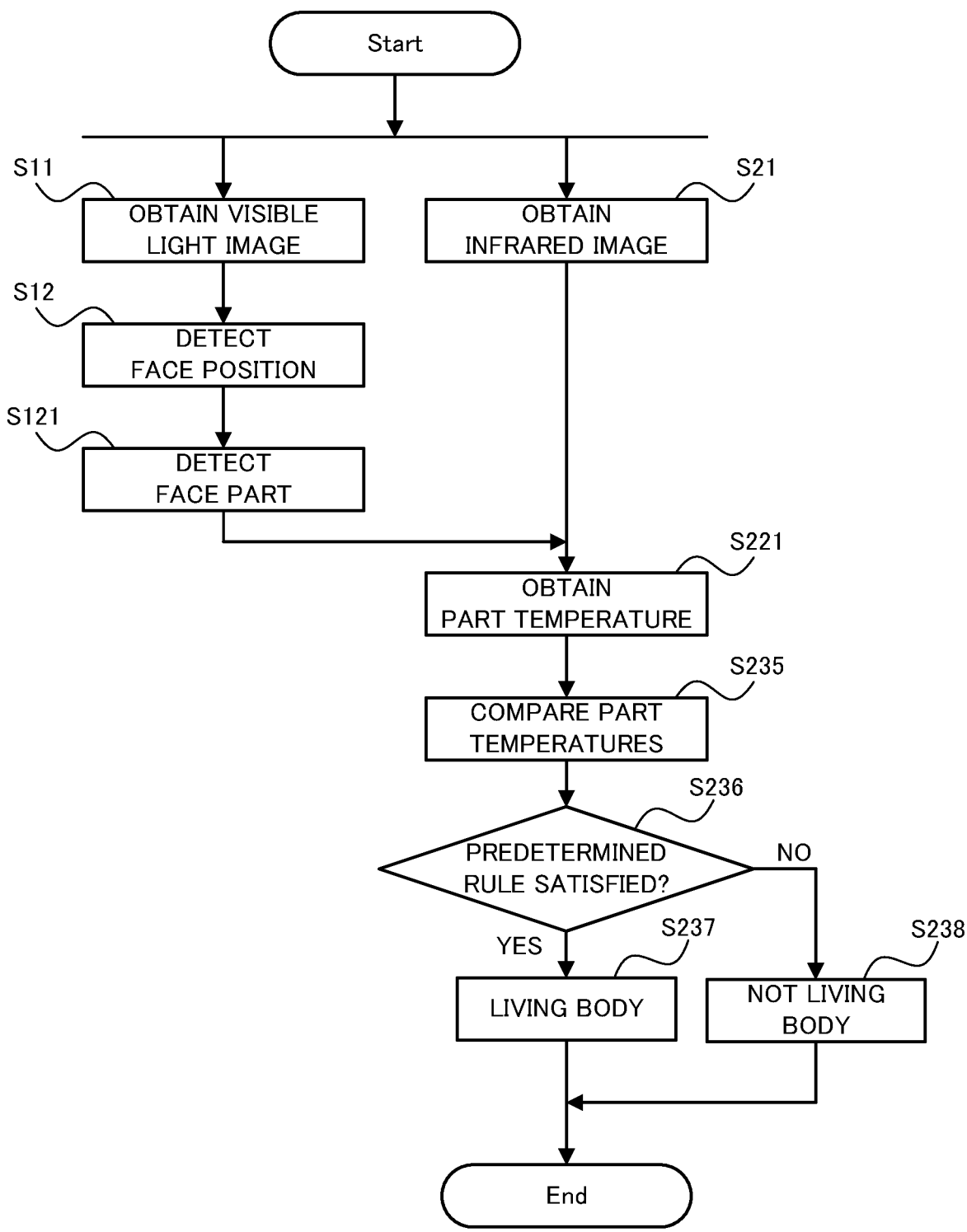
FIG. 16 is a flowchart illustrating a flow of operation of the biometric determination system according to the sixth example embodiment.

As illustrated in FIG. 16, at the start of the operation of the biometric determination system 10 according to the sixth example embodiment, first, the face detection unit 110 obtains the visible light image (the step S11). Then, the face detection unit 110 detects the position of the face from the obtained visible light image (the step S12).

Subsequently, the part detection unit 111 detects the position of the part of the face (the step S121). The part detection unit 111 outputs the information about the detected position of the part of the face, to the temperature acquisition unit 120.

On the other hand, the temperature acquisition unit 120 obtains the infrared image (the step S21). Then, the part temperature acquisition unit 121 obtains the temperature of the part of the face, from the obtained infrared image and the position of the part of the face detected by the part detection unit 111 (the step S221).

Subsequently, the temperature comparison unit 132 compares the temperatures of the parts with each other (step S235). Then, the temperature comparison unit 132 determines whether or not the comparison result satisfies the predetermined rule (step S236). When the comparison result satisfies the predetermined rule (the step S236: YES), the biometric determination unit 130 determines that the face belongs to a living body (step S237). On the other hand, when the comparison result does not satisfy the predetermined rule (the step S236: NO), the biometric determination unit 130 determines that the face does not belong to a living body (step S238).
(Technical Effect)

Next, a technical effect obtained by the biometric determination system 10 according to the sixth example embodiment will be described.

As described with reference to FIG. 15 and FIG. 16, in the biometric determination system according to the sixth example embodiment, the temperatures at the plurality of points of the face are compared with each other. In this way, it is possible to properly determine whether or not the face belongs to a living body on the basis of the relationship between the temperatures at the plurality of points of the face.

Seventh Example Embodiment

The biometric determination system 10 according to a seventh example embodiment will be described with reference to FIG. 17 to FIG. 19. The seventh example embodiment is partially different from the first to sixth example embodiments only in the configuration and operation, and may be the same as the first to sixth example embodiments in other parts. For this reason, the parts that differ from each of the example embodiments described above will be described in detail below, and a description of the other overlapping parts will be omitted as appropriate.
(Functional Configuration)

First, with reference to FIG. 17, a functional configuration of the biometric determination system 10 according to the seventh example embodiment will be described. FIG. 17 is a block diagram illustrating the functional configuration of the biometric determination system according to the seventh example embodiment. In FIG. 17, the same components as those illustrated in FIG. 2 carry the same reference numerals.

Figure 17:
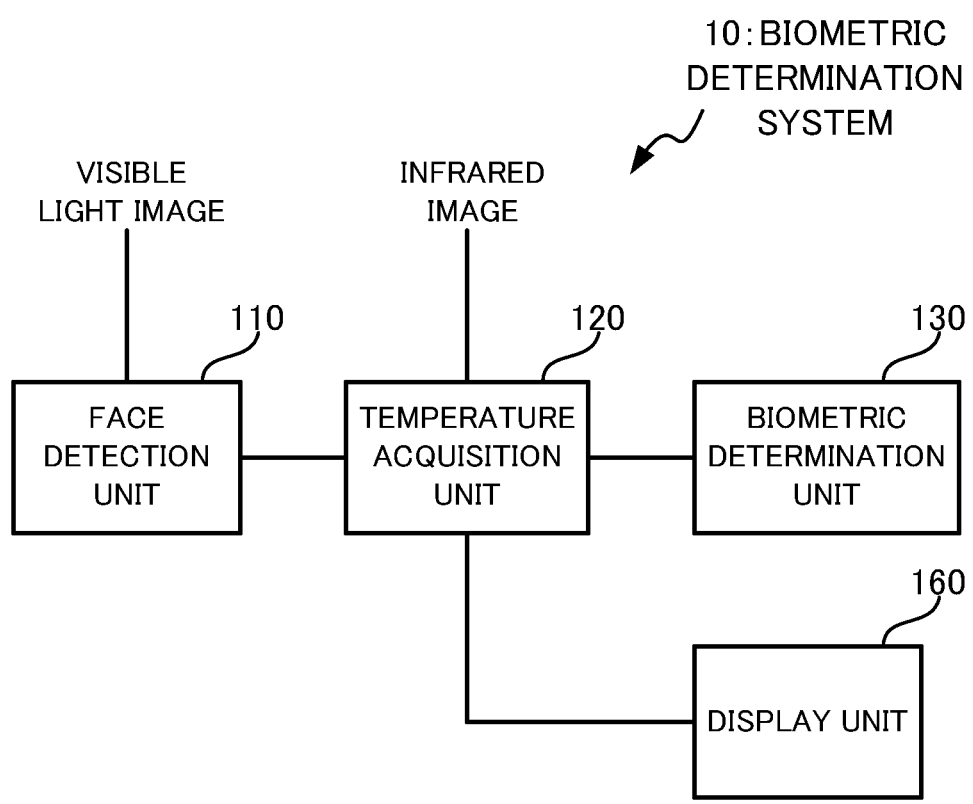
FIG. 17 is a block diagram illustrating a functional configuration of a biometric determination system according to a seventh example embodiment.

As illustrated in FIG. 17, the biometric determination system 10 according to the seventh example embodiment includes, as processing blocks or physical processing circuits for realizing its functions, the face detection unit 110, the temperature acquisition unit 120, the biometric determination unit 130, and a display unit 160. In other words, the biometric determination system 10 according to the seventh example embodiment further includes a display unit 160 in addition to the configuration of the biometric determination system according to the first example embodiment (see FIG. 2). The display unit 160 may be realized or implemented by the output apparatus 16 (see FIG. 1), for example.

The display unit 160 is configured to display the temperatures at the plurality of points of the face obtained by the temperature acquisition unit 120. The display unit 160 may be configured to change a display aspect by an operation of a user of the system (e.g., a system user or a system administrator, etc.). Specific examples of the display aspect in the display unit 160 will be described in detail below.
(Display Examples of Display Unit)

Figure 18:
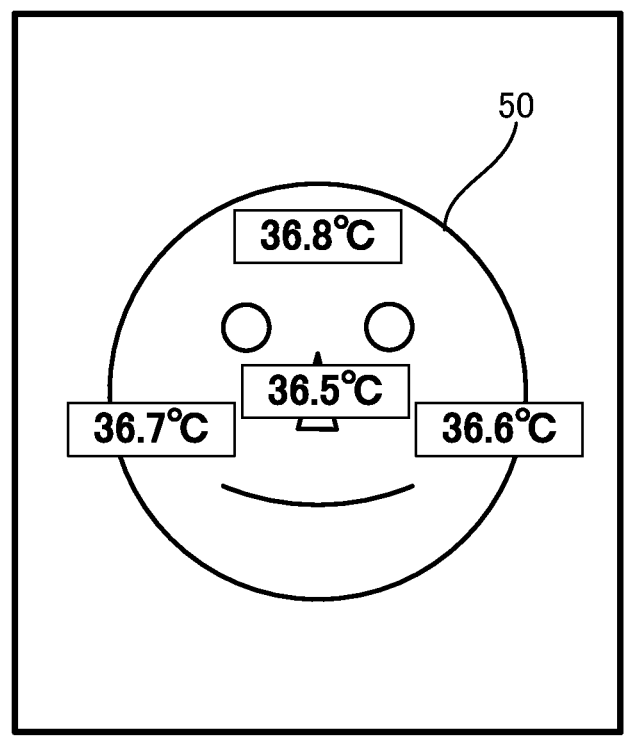
FIG. 18 is a diagram illustrating version 1 of a display example by the biometric determination system according to the seventh example embodiment.

Next, with reference to FIG. 18 and FIG. 19, display examples by the display unit 160 of the biometric determination system 10 according to the seventh example embodiment will be specifically described. FIG. 18 is a diagram illustrating version 1 of a display example by the biometric determination system according to the seventh example embodiment. FIG. 19 is a diagram illustrating version 2 of a display example by the biometric determination system according to the seventh example embodiment.

As illustrated in FIG. 18, the display unit 160 of the biometric determination system 10 according to the seventh example embodiment may superimpose and display the obtained temperature on an image of a face 50. In the example illustrated in FIG. 18, a temperature of the forehead of "36.8 degrees C." is superimposed and displayed on the forehead of the face 50. A temperature of the right cheek of "36.7 degrees C." is superimposed and displayed on the right cheek of the face 50. A temperature of the left cheek of "36.6 degrees C." is superimposed and displayed on the left cheek of the face 50. A temperature of the nose of "36.5 degrees C." is superimposed and displayed on the nose of the face 50.

The temperature of each part displayed in FIG. 18 may be configured to be switchable between display and non-display for each part, by the system user. Furthermore, the temperature of each part may be changed in color or highlighted in accordance with a numerical value of the temperature. For example, the temperature that exceeds the predetermined threshold may be displayed in red or displayed in bold letters.

As illustrated in FIG. 19, the display unit 160 of the biometric determination system 10 according to the seventh example embodiment may display a list of the temperature of each unit and the determination result (e.g., the determination result by the threshold determination unit 131). In the example embodiment illustrated in FIG. 19, the temperature of the forehead is "36.8 degrees C." and the determination result is displayed as "OK (e.g., the temperature exceeds the threshold)". The temperature of the right cheek is "36.7 degrees C." and the determination result is displayed as "OK". The temperature of the nose is "30.5 degrees C." and the determination result is displayed as "NG (e.g., the temperatures is less than the threshold)." The temperature of the left cheek is "22.8 degrees C." and the determination result is displayed as "NG".

The items illustrated in FIG. 19 may be rearranged and displayed as appropriate, in accordance with a predetermined condition. For example, the items may be rearranged and displayed in descending order of temperature, or may be rearranged and displayed such that the items with a determination of "OK" are in high ranking. The predetermined condition for determining the display order of each item may be configured to be changeable by the operation of the system user. Each item may also be change in color or highlighted in accordance with its content. For example, the item with a determination of OK may be displayed in red or surrounded by a frame.
(Technical Effect)

Next, a technical effect obtained by the biometric determination system 10 according to the seventh example embodiment will be described.

As described with reference to FIG. 17 and FIG. 19, in the biometric determination system according to the seventh example embodiment, the temperatures at the plurality of parts of the face obtained by the temperature acquisition unit 120 are displayed by the display unit 160. Therefore, the temperature of each part of the face can be visually presented to the user. A presentation target of various types of information by the display unit 160 may be a target person whose face is imaged, or may be a monitoring person, a security guard, or the like who uses the system. When it is not desirable to let the target person know specifically which part of the face is being measured, the information may not be displayed for the target person, but may be displayed only for the monitoring person or the security guard. In addition, instead of not displaying the information for the target person, only simple information may be displayed for the target person, and detailed information may be displayed for the monitoring person or the like. For example, only the highest temperature of the parts may be displayed for the target person, while the temperatures of all the parts may be displayed for the monitoring person or the like.

Eighth Example Embodiment

The biometric determination system 10 according to an eighth example embodiment will be described with reference to FIG. 20 and FIG. 21. The eighth example embodiment is different from the first to seventh example embodiments described above only in the configuration and operation, and may be the same as the first to seventh example embodiments in other parts. For this reason, the parts that differ from each of the example embodiments described above will be described in detail below, and a description of the other overlapping parts will be omitted as appropriate.
(Functional Configuration)

First, with reference to FIG. 20, a functional configuration of the biometric determination system 10 according to the eighth example embodiment will be described. FIG. 20 is a block diagram illustrating the functional configuration of the biometric determination system according to the eighth example embodiment. In FIG. 20, the same components as those illustrated in FIG. 4 carry the same reference numerals.

Figure 20:
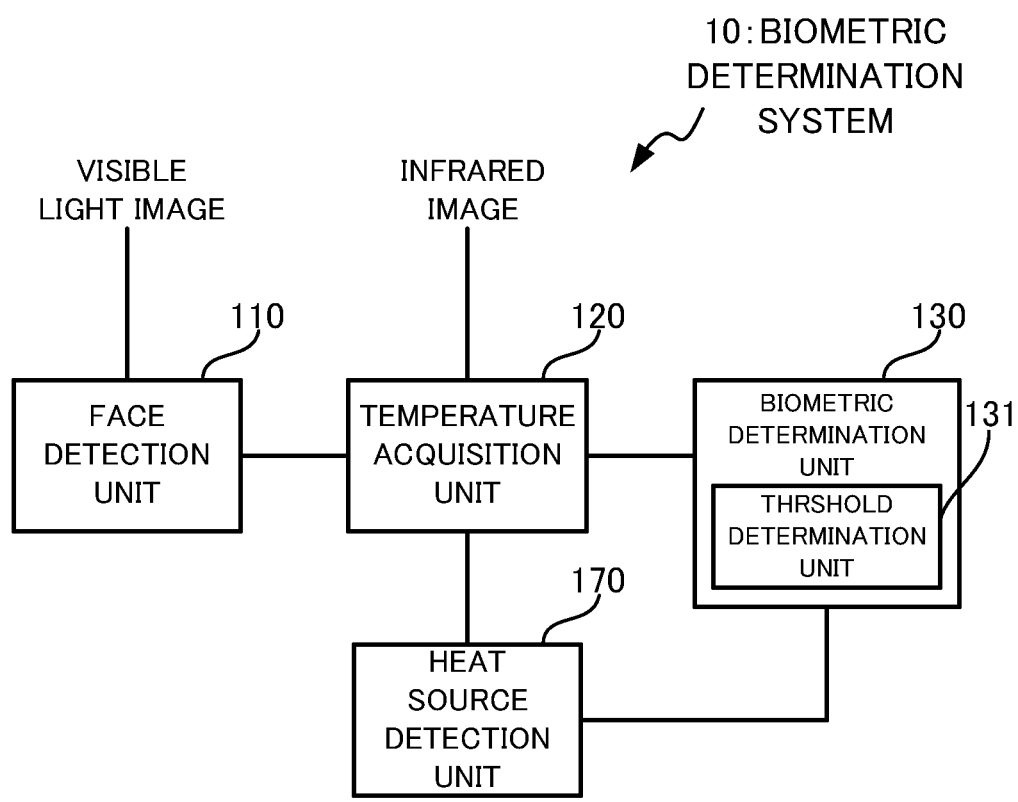
FIG. 20 is a block diagram illustrating a functional configuration of a biometric determination system according to an eighth example embodiment.

As illustrated in FIG. 20, the biometric determination system 10 according to the eighth example embodiment includes, as processing blocks or physical processing circuits for realizing its functions, the face detection unit 110, the temperature acquisition unit 120, the biometric determination unit 130, and a heat source detection unit 170. In other words, the biometric determination system 10 according to the eighth example embodiment further includes a heat source detection unit 170 in addition to the configuration of the biometric determination system according to the second example embodiment (see FIG. 4). The heat source detection unit 170 may be realized or implemented by the processor 11 (see FIG. 1), for example.

The heat source detection unit 170 is configured to detect a heat source of a predetermined shape from the infrared image. Here, the "heat source of the predetermined shape" is a heat source that can be used for "spoofing" (e.g., a heat source for providing a photograph or the like with a temperature similar to the body temperature), and for example, a heating pad or body warmer called kairo in Japanese, a smartphone, a tablet, or the like. These heat sources are detectable, for example, as a rectangular, unnatural high-temperature area in the infrared image. The heat source detection unit 170 is further configured to perform an operation of making difficult such a determination that the face belongs to a living body, when the heat source of the predetermined shape is detected. The heat source detection unit 170 may make difficult such a determination that the face belongs to a living body, by increasing the threshold of the threshold determination unit 131, for example.

(Flow of Operation)

Next, with reference to FIG. 21, a flow of operation of the biometric determination system according to the seventh example embodiment will be described. FIG. 21 is a flowchart illustrating the flow of the operation of the biometric determination system according to the seventh example embodiment. In FIG. 21, the same steps as those illustrated in FIG. 5 carry the same reference numerals.

Figure 21:
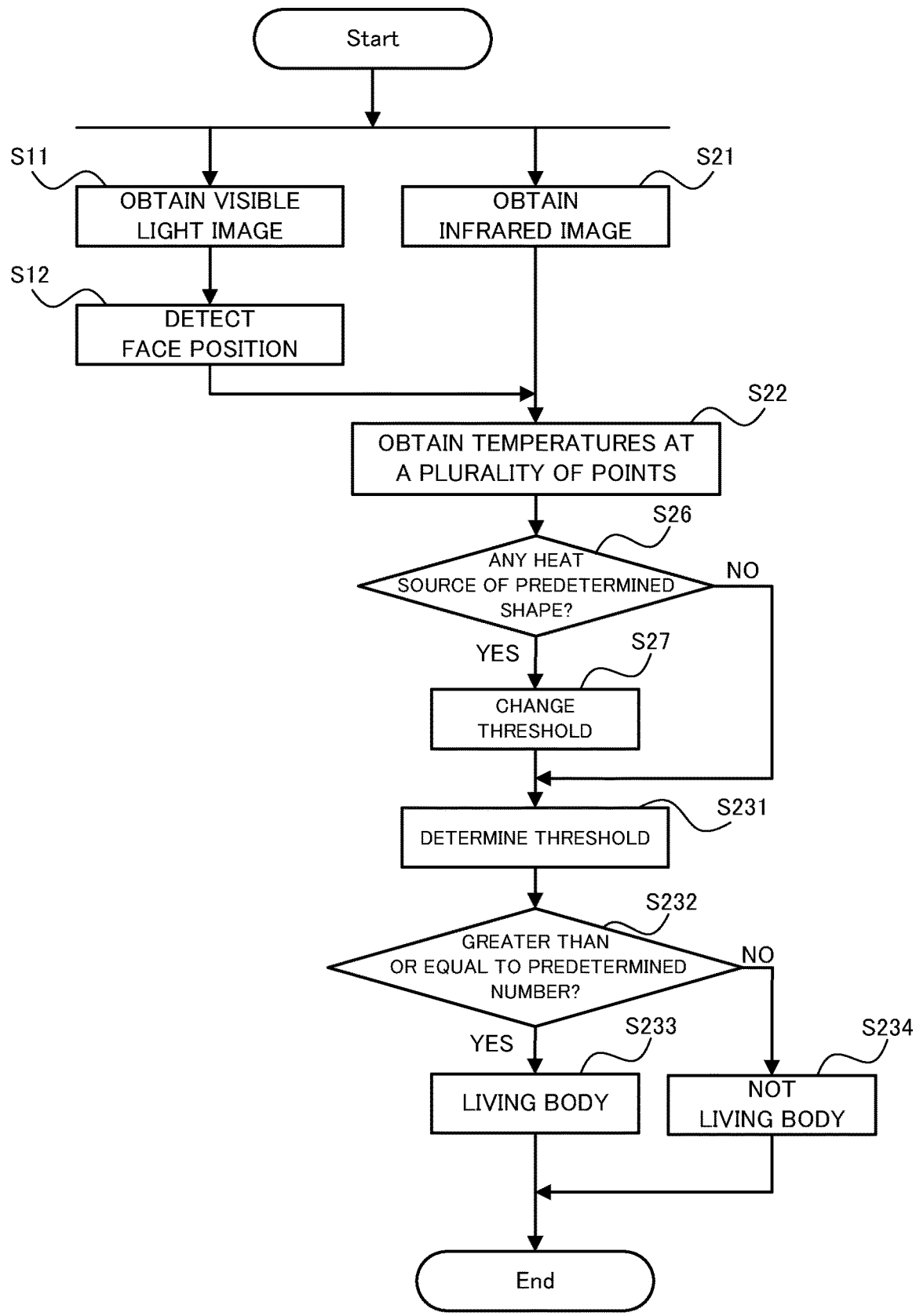
FIG. 21 is a flowchart illustrating a flow of operation of the biometric determination device according to the eighth example embodiment.

As illustrated in FIG. 21, at the start of the operation of the biometric determination system 10 according to the eighth example embodiment, first, the face detection unit 110 obtains the visible light image (the step S11). Then, the face detection unit 110 detects the position of the face from the obtained visible light image (the step S12). The face detection unit 110 outputs the information about the detected position of the face to the temperature acquisition unit 120.

On the other hand, the temperature acquisition unit 120 obtains the infrared image (the step S21). Then, the temperature acquisition unit 120 obtains the temperatures at the plurality of points of the face, from the obtained infrared image and the position of the face detected by the face detection unit 110 (the step S22).

Subsequently, the heat source detection unit 170 detects the heat source of the predetermined shape from the temperatures at the plurality of points of the face (step S26). The heat source detection unit 170 may detect the heat source of predetermined shapes from the infrared image obtained by the temperature acquisition unit 120. When the heat source of the predetermined shape is detected (the step S26: YES), the heat source detection unit 170 changes the predetermined threshold used by the threshold determination unit 131 to increase (step S27). On the other hand, when the heat source of the predetermined shape is not detected (the step S26: NO), the heat source detection unit 170 does not change the predetermined threshold used by the threshold determination unit 131 (i.e., the step S27 is omitted).

Subsequently, the threshold determination unit 131 determines whether each of the plurality of temperatures exceeds the predetermined threshold (a threshold after the change if the threshold is changed in the step S27) (step S231). Then, the threshold determination unit 131 determines whether or not the number of temperatures that exceed the predetermined threshold is greater than or equal to the predetermined number (the step S232). When the number of temperatures that exceed the predetermined threshold is greater than or equal to the predetermined number (the step S232: YES), the biometric determination unit 130 determines that the face belongs to a living body (the step S233). On the other hand, when the number of temperatures that exceed the predetermined threshold is less than the predetermined number (the step S232: NO), the biometric determination unit 130 determines that the face does not belong to a living body (the step S234).

(Technical Effect)

Next, a technical effect obtained by biometric determination system 10 according to the eighth example embodiment will be described.

As described with reference to FIG. 20 and FIG. 21, in the biometric determination system according to the eighth example embodiment, the heat source of the predetermined shapes is detected. Therefore, it is possible to detect the "spoofing" that uses the heat source, and when such a spoofing is detected, it is possible to make difficult such a determination that the face belongs to a living body. In such a configuration that the biometric determination system 10 is allowed to perform face authentication as in a ninth example embodiment described later, the face authentication may be difficult to succeed (e.g., the threshold used for face verification may be changed) when the heat source of the predetermined shape is detected.

Ninth Example Embodiment

The biometric determination system 10 according to a ninth example embodiment will be described with reference to FIG. 22 and FIG. 23. The ninth example embodiment is partially different from the first to eighth example embodiments described above only in the configuration and operation, and may be the same as the first to eighth example embodiments in other parts. For this reason, the parts that differ from each of the example embodiments described above will be described in detail below, and a description of the other overlapping parts will be omitted as appropriate.

(Functional Configuration)

First, with reference to FIG. 22, a functional configuration of the biometric determination system 10 according to the ninth example embodiment will be described. FIG. 22 is a block diagram illustrating the functional configuration of the biometric determination system according to the ninth example embodiment. In FIG. 22, the same components as those illustrated in FIG. 2 carry the same reference numerals.

Figure 22:
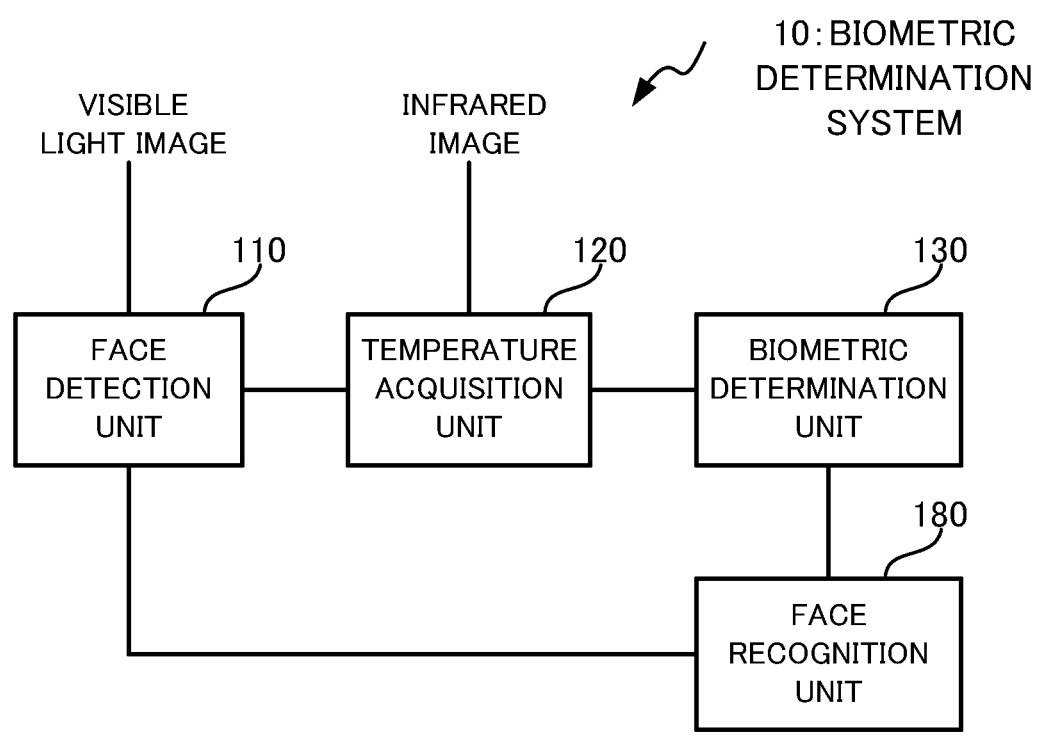
FIG. 22 is a block diagram illustrating a functional configuration of a biometric determination system according to a ninth example embodiment.

As illustrated in FIG. 22, the biometric determination system 10 according to the ninth example embodiment includes, as processing blocks or physical processing circuits for realizing its functions, the face detection unit 110, the temperature acquisition unit 120, the biometric determination unit 130, and a face authentication unit 180. In other words, the biometric determination system 10 according to the ninth example embodiment further includes a face authentication unit 180 in addition to the configuration of the biometric determination system according to the first example embodiment (see FIG. 2). The face authentication unit 180 may be realized or implemented by the processor 11 (see FIG. 1), for example.

The face authentication unit 180 is configured to by verify the face detected from the image with a previously registered face and to perform face authentication (specifically, a process of determining whether or not the target whose face is imaged is a registered person). The face authentication unit 180 may extract the feature quantity of the face from the face detected by the face detection unit 110 and perform the face authentication by using the feature quantity. A detailed description of a more specific method of the face authentication will be omitted here because the existing techniques/technologies can be adopted to the method as appropriate. The face authentication unit 180 is configured to output a final authentication result in view of the determination result by the biometric determination system 10 according to the example embodiments described above (i.e., whether or not the face belongs to a living body).

(Flow of Operation)

Next, with reference to FIG. 23, a flow of operation of the biometric determination system according to the ninth example embodiment will be described. FIG. 23 is a flowchart illustrating the flow of the operation of the biometric determination system according to the ninth example embodiment. In FIG. 23, the same steps as those illustrated in FIG. 3 carry the same reference numerals.

Figure 23:
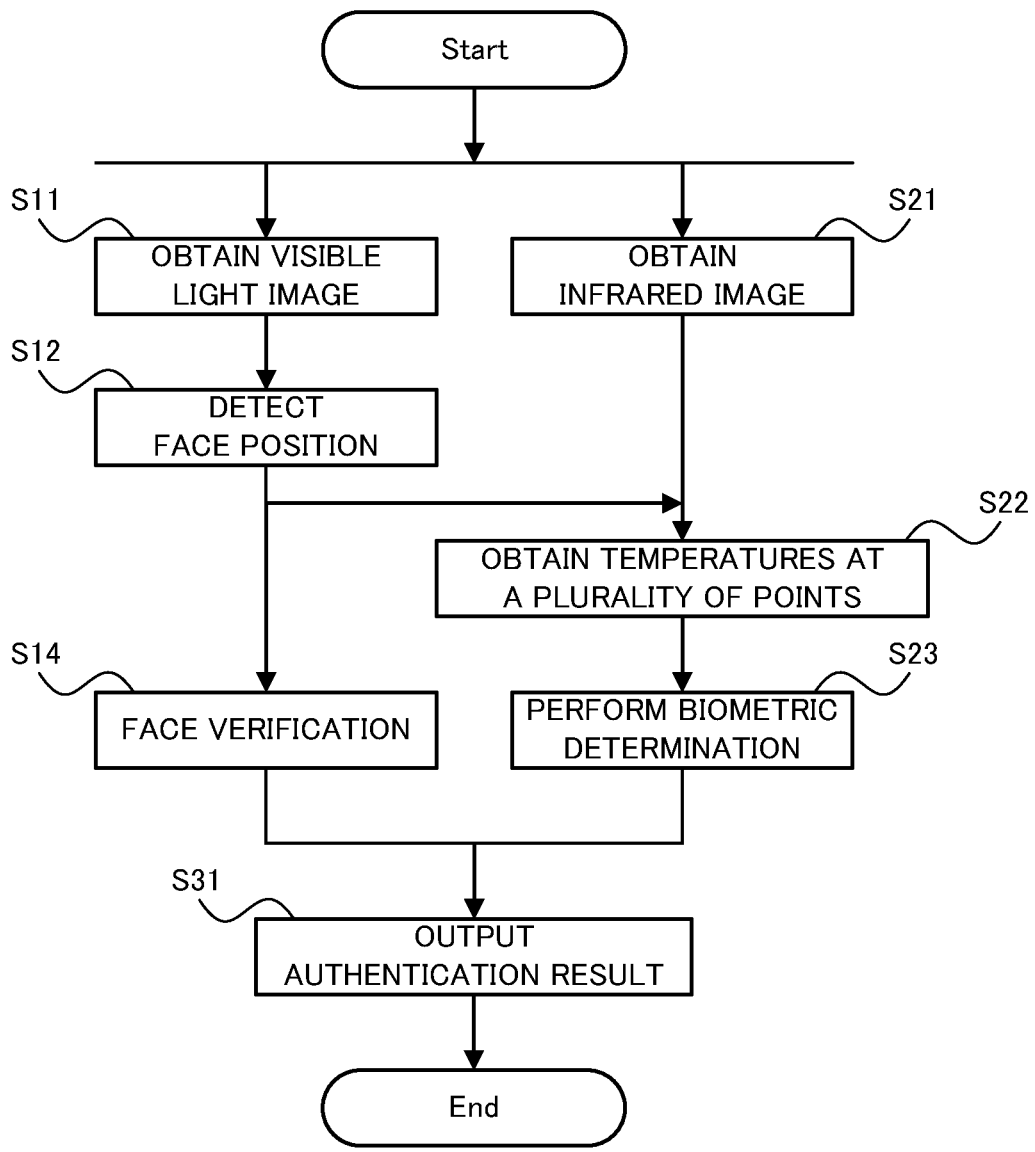
FIG. 23 is a flowchart illustrating a flow of operation of the biometric determination system according to the ninth example embodiment

As illustrated in FIG. 23, at the start of the operation of the biometric determination system 10 according to the ninth example embodiment, first, the face detection unit 110 obtains the visible light image (the step S11). Then, the face detection unit 110 detects the position of the face from the obtained visible light image (the step S12). The face detection unit 110 outputs the information about the detected position of the face to the temperature acquisition unit 120. Then, the face authentication unit 180 performs the face verification by using the information about the face detected by the face detection unit 110 (step S14).

On the other hand, the temperature acquisition unit 120 obtains the infrared image (the step S21). Then, the temperature acquisition unit 120 obtains the temperatures at the plurality of points of the face, from the obtained infrared image and the position of the face detected by the face detection unit 110 (the step S22). Then, the biometric determination unit 130 determines whether or not the face belongs to a living body on the basis of the temperatures at the plurality of points obtained by the temperature acquisition unit 120 (the step S23). The biometric determination unit 130 outputs the determination result to the face authentication unit 180

Finally, the face authentication unit 180 outputs the authentication result of the face authentication, in view of a result of the face verification in the step S14 and the result of the biometric determination in the step S23. The face authentication unit 180 may output such a result that the face authentication is succeeded when the face verification is succeeded and when it is determined that the face belongs to a living body, for example. The face authentication unit 180 may output such a result that the face authentication is failed when the face verification is failed or when it is determined that the face does not belong to a living body. In addition, the face authentication unit 180 may repeat a series of processing steps illustrated in FIG. 23 (i.e., may retry an authentication process) when the face authentication is failed.

(Technical Effect)

Next, a technical effect obtained by the biometric determination system 10 according to the ninth example embodiment will be described.

As described with reference to FIG. 22 and FIG. 23, in the biometric determination system 10 according to the ninth example embodiment, the determination result of the biometric determination unit 130 (i.e., the determination result of whether or not the face belongs to a living body) is used for the face authentication. Therefore, it is possible to detect "spoofing" or the like in the face authentication and to detect a user who illegally tries to detect the face authentication.

<Supplementary Notes>

The example embodiments described above may be further described as, but not limited to, the following Supplementary Notes below.

(Supplementary Note 1)

A biometric determination system described in Supplementary Note 1 is a biometric determination system including: a face detection unit that detects a position of a face from an image including the face; a temperature acquisition unit that obtains temperatures at a plurality of points of the face; and a biometric determination unit that determines whether or not the face belongs to a living body on the basis of the temperatures at the plurality of points.

(Supplementary Note 2)

A biometric determination system described in Supplementary Note 2 is the biometric determination system described in Supplementary Note 1, wherein the biometric determination unit determines that the face belongs to a living body when a number of the temperatures at the plurality of points that exceed a predetermined threshold is greater than or equal to a predetermined number.

(Supplementary Note 3)

A biometric determination system described in Supplementary Note 3 is the biometric determination system described in Supplementary Note 1 or 2, further including a part detection unit that detects positions of a plurality of parts of the face on the basis of the position of the face, wherein the temperature acquisition unit obtains a plurality of part temperatures corresponding to the respective positions of the plurality of parts, as the temperatures at the plurality of points.

(Supplementary Note 4)

A biometric determination system described in Supplementary Note 4 is the biometric determination system described in any one of Supplementary Notes 1 to 3, further including a wearing item determination unit that determines whether or not there is a wearing item on the face on the basis of the temperatures at the plurality of points.

(Supplementary Note 5)

A biometric determination system described in Supplementary Note 5 is the biometric determination system described in Supplementary Note, further including a wearing item detection unit that detects the wearing item from the image, wherein the biometric determination unit determines whether or not the face belongs to a living body by comparing information about the wearing item detected by the wearing item detection unit with information about the wearing item determined by the wearing item determination unit.

(Supplementary Note 6)

A biometric determination system described in Supplementary Note 6 is the biometric determination system described in any one of Supplementary Notes 1 to 5, wherein the biometric determination unit determines whether or not the face belongs to a living body by comparing the temperatures at the plurality of points with each other.

(Supplementary Note 7)

A biometric determination system described in Supplementary Note 7 is the biometric determination system described in any one of Supplementary Notes 1 to 6, further including a display unit that superimposes and displays the temperatures at the plurality of points on the image of the face.

(Supplementary Note 8)

A biometric determination system described in Supplementary Note 8 is the biometric determination system described in any one of Supplementary Notes 1 to 7, further including a heat source detection unit that detects a heat source of a predetermined shapes on the face on the basis of the temperatures at the plurality of points, wherein the biometric determination unit hardly determines that the face belongs to a living body when the heat source of the predetermined shape is detected.

(Supplementary Note 9)

A biometric determination method described in Supplementary Note 9 is a biometric determination method including: detecting a position of a face from an image including the face; obtaining temperatures at a plurality of points of the face; and determining whether or not the face belongs to a living body on the basis of the temperatures at the plurality of points.

(Supplementary Note 10)

A computer program described in Supplementary Note 10 is a computer program that operates a computer: to detect a position of a face from an image including the face; to obtain temperatures at a plurality of points of the face; and to determine whether or not the face belongs to a living body on the basis of the temperatures at the plurality of points.

(Supplementary Note 11)

A recording medium described in Supplementary Note 11 is a recording medium on which the computer program described in Supplementary Note 10 is recorded.

This disclosure is not limited to the examples described above and is allowed to be changed, if desired, without departing from the essence or spirit of this disclosure which can be read from the claims and the entire specification. A biometric determination system, a biometric determination method, and a computer program with such changes are also intended to be within the technical scope of this disclosure.

DESCRIPTION OF REFERENCE CODES

10 Biometric determination system
11 Processor
110 Face detection unit
111 Part detection unit
120 Temperature acquisition unit
121 Part temperature acquisition unit
130 Biometric determination unit
131 Threshold determination unit
132 Temperature comparison unit
140 Wearing item determination unit
150 Wearing item detection unit
160 Display unit
170 Heat source detection unit
180 Face authentication unit

What is claimed is:

1. A biometric determination system comprising:
at least one memory that is configured to store instructions; and
at least one first processor that is configured to execute the instructions to
detect a position of a face from an image including the face;
obtain temperatures at a plurality of points of the face;
calculate a predetermined score in accordance with whether the temperatures at the plurality of points exceed a predetermined threshold;
determine whether or not the predetermined score exceeds a score threshold; and
determine whether or not the face belongs to a living body on the basis of the temperatures at the plurality of points, including determining that the face belongs to the living body when a number of the temperatures at the plurality of points exceeding a predetermined threshold is greater than or equal to a predetermined number.

2. The biometric determination system according to claim 1, further comprising a second processor that is configured to execute instructions to detect positions of a plurality of parts of the face on the basis of the position of the face, wherein
the at least one first processor that is configured to execute the instructions to obtain a plurality of part temperatures corresponding to the respective positions of the plurality of parts, as the temperatures at the plurality of points.

3. The biometric determination system according to claim 1, further comprising a third processor that is configured to execute instructions to determine whether or not there is a wearing item on the face on the basis of the temperatures at the plurality of points.

4. The biometric determination system according to claim 3, further comprising a fourth processor that is configured to execute instructions to detect the wearing item from the image, wherein
the at least one first processor that is configured to execute the instructions to determine whether or not the face belongs to a living body by comparing information about the wearing item detected by the fourth processor with information about the wearing item determined by the third processor.

5. The biometric determination system according to claim 1, wherein the at least one first processor that is configured to execute the instructions to determine whether or not the face belongs to a living body by comparing the temperatures at the plurality of points with each other.

6. The biometric determination system according to claim 1, further comprising a fifth processor that is configured to execute instructions to superimpose and display the temperatures at the plurality of points on the image of the face.

7. The biometric determination system according to claim 1, further comprising a sixth processor that is configured to execute instructions to detect a heat source of a predetermined shapes on the face on the basis of the temperatures at the plurality of points, wherein
the at least one first processor that is configured to execute the instructions to hardly determine that the face belongs to a living body when the heat source of the predetermined shape is detected.

8. A biometric determination method performed by one or more processors and comprising:
detecting a position of a face from an image including the face;
obtaining temperatures at a plurality of points of the face;

calculating a predetermined score in accordance with whether the temperatures at the plurality of points exceed a predetermined threshold;
determining whether or not the predetermined score exceeds a score threshold; and;
determining whether or not the face belongs to a living body on the basis of the temperatures at the plurality of points, including determining that the face belongs to the living body when a number of the temperatures at the plurality of points exceeding a predetermined threshold is greater than or equal to a predetermined number.

9. A non-transitory recording medium storing a computer program executable by a computer to perform a biometric determination method comprising:
detecting a position of a face from an image including the face;
obtaining temperatures at a plurality of points of the face;
calculating a predetermined score in accordance with whether the temperatures at the plurality of points exceed a predetermined threshold;
determining whether or not the predetermined score exceeds a score threshold; and;
determining whether or not the face belongs to a living body on the basis of the temperatures at the plurality of points, including determining that the face belongs to the living body when a number of the temperatures at the plurality of points exceeding a predetermined threshold is greater than or equal to a predetermined number.

* * * * *